(12) United States Patent
Togano et al.

(10) Patent No.: US 6,310,677 B1
(45) Date of Patent: Oct. 30, 2001

(54) LIQUID CRYSTAL DEVICE AND LIQUID CRYSTAL DISPLAY APPARATUS HAVING A CHEVRON STRUCTURE IN MONOSTABLE ALIGNMENT

(75) Inventors: Takeshi Togano, Chigasaki; Masahiro Terada, Hadano; Shosei Mori, Hiratsuka; Yasufumi Asao; Takashi Moriyama, both of Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/257,032

(22) Filed: Feb. 25, 1999

(30) Foreign Application Priority Data

Feb. 27, 1998 (JP) .................................................. 10-047004
Feb. 18, 1999 (JP) .................................................. 11-039954

(51) Int. Cl.$^7$ .................................................. C09K 19/02
(52) U.S. Cl. .................................................. 349/172
(58) Field of Search .................................................. 349/172

(56) References Cited

U.S. PATENT DOCUMENTS

| 4,367,924 | 1/1983 | Clark et al. | 350/334 |
| 5,214,523 | * 5/1993 | Nito et al. | 349/173 |
| 5,458,804 | 10/1995 | Yamada et al. | 252/299.01 |
| 5,629,788 | 5/1997 | Mori et al. | 349/172 |
| 5,728,318 | 3/1998 | Yamashita et al. | 252/299.62 |
| 5,790,223 | 8/1998 | Hanyu et al. | 349/184 |
| 5,895,107 | * 4/1999 | Haslam | 349/172 |

FOREIGN PATENT DOCUMENTS 63-143529 * 6/1988 (JP) .

OTHER PUBLICATIONS

M. Schadt and W. Helfrich, "Voltage–Dependent Optical Activity of a Twisted Nematic Liquid Crystal", Appl. Phys. Letters, vol. 18, No. 4, Feb. 15, 1971.

* cited by examiner

Primary Examiner—Walter J. Malinowski
(74) Attorney, Agent, or Firm—Fitzpatrick, Cella, Harper & Scinto

(57) ABSTRACT

A liquid crystal device has a pair of oppositely disposed substrates and a liquid crystal having chiral smectic C phase disposed therebetween. The liquid crystal is placed in an alignment state in chiral smectic C phase with smectic molecular layers forming a chevron structure. Under no electric field application, the liquid crystal has an average molecular axis substantially in alignment with the uniaxial alignment axis and/or a bisector of a maximum angle formed between two extreme molecular axes established under electric field application, while under electric field application, the liquid crystal provides an effective tilt angle and a transmittance that continuously changes depending on an electric field applied thereto.

12 Claims, 18 Drawing Sheets

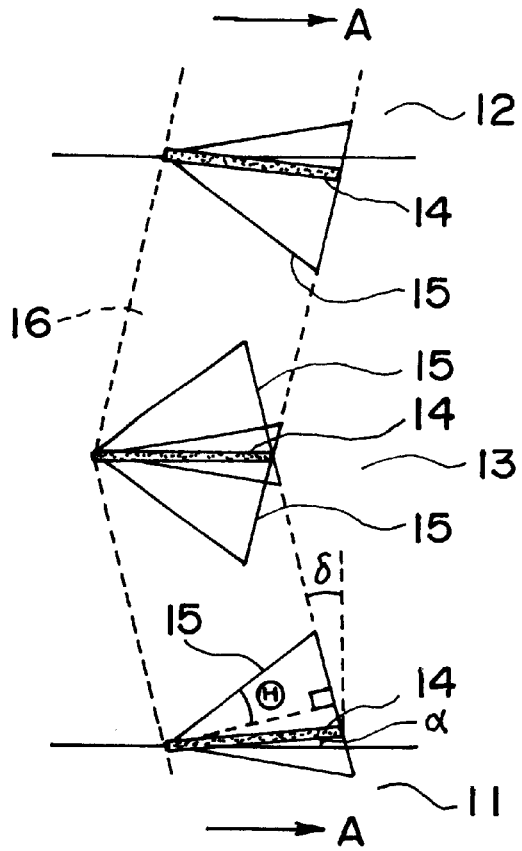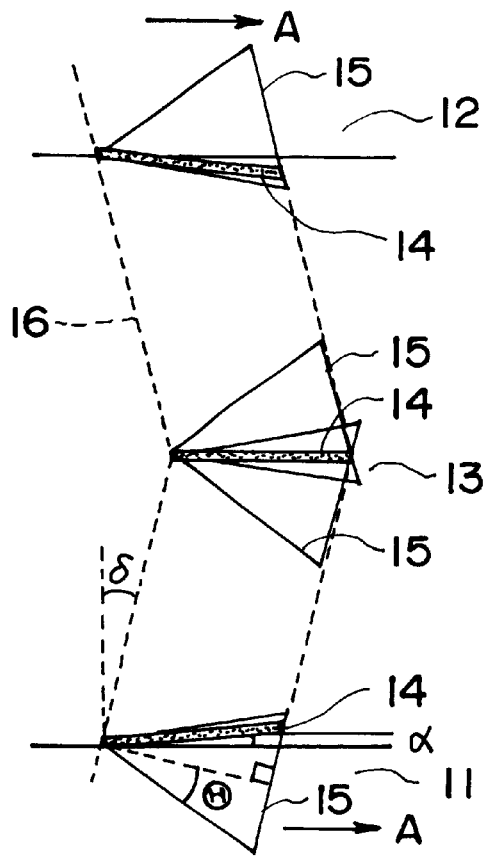
C1 ALIGNMENT
$(\unicode{x24BD} > \delta)$
C2 ALIGNMENT
$(\unicode{x24BD} > \delta)$
FIG. 1A
FIG. 1B

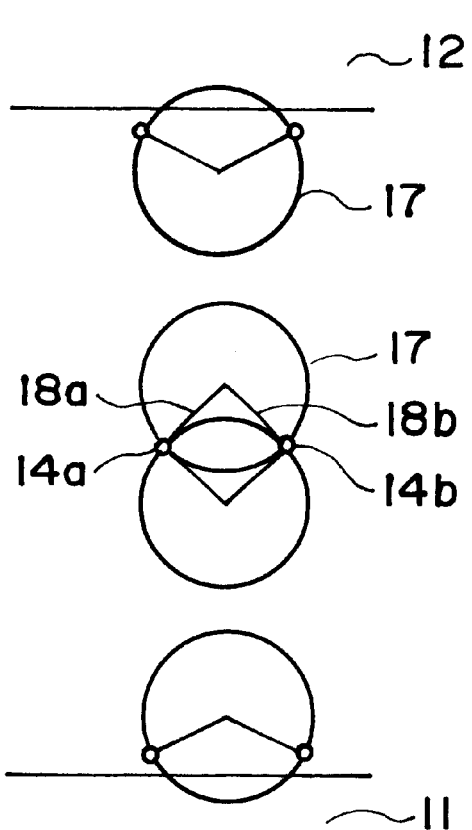
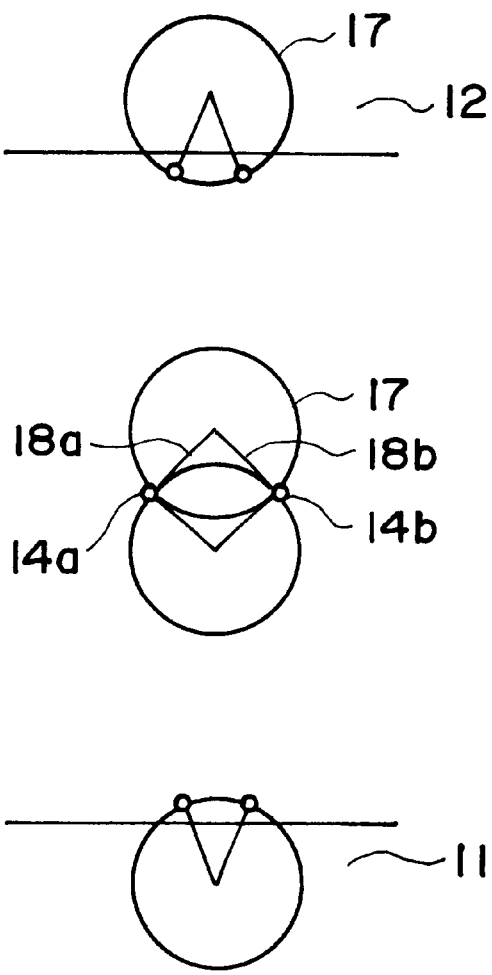
FIG. 2A  C1 ALIGNMENT ($\text{\textcircled{H}} > \delta$)
FIG. 2B  C2 ALIGNMENT ($\text{\textcircled{H}} > \delta$)

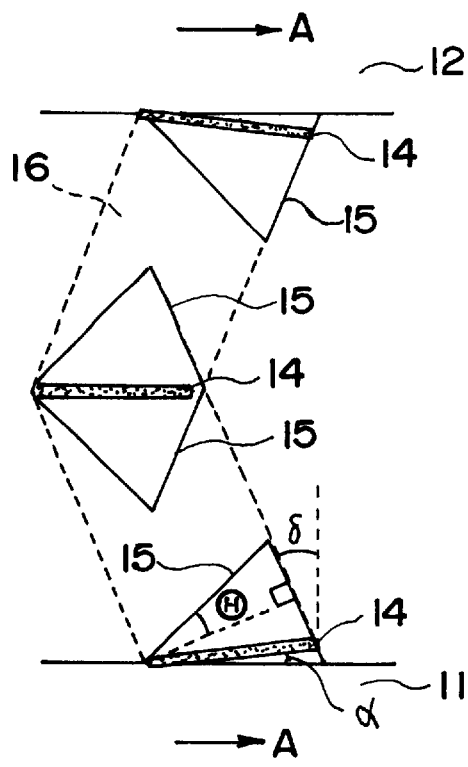
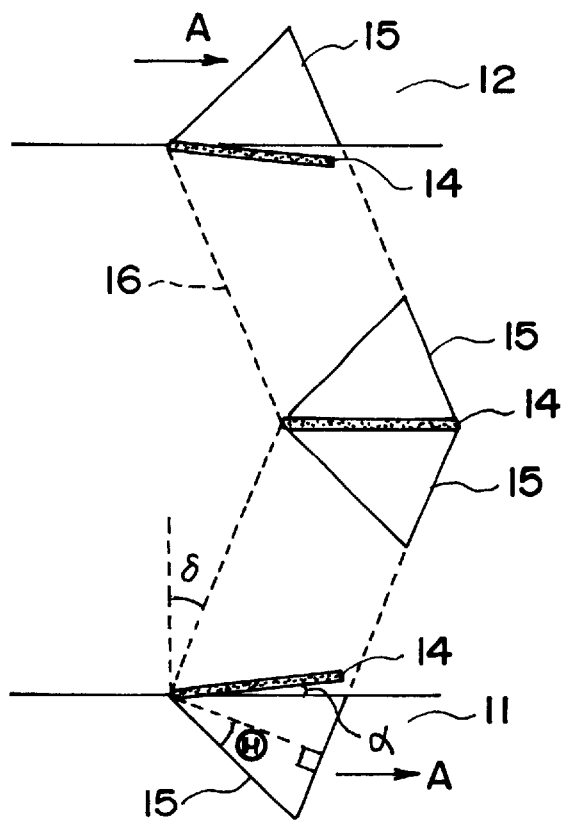
F I G. 3A       F I G. 3B

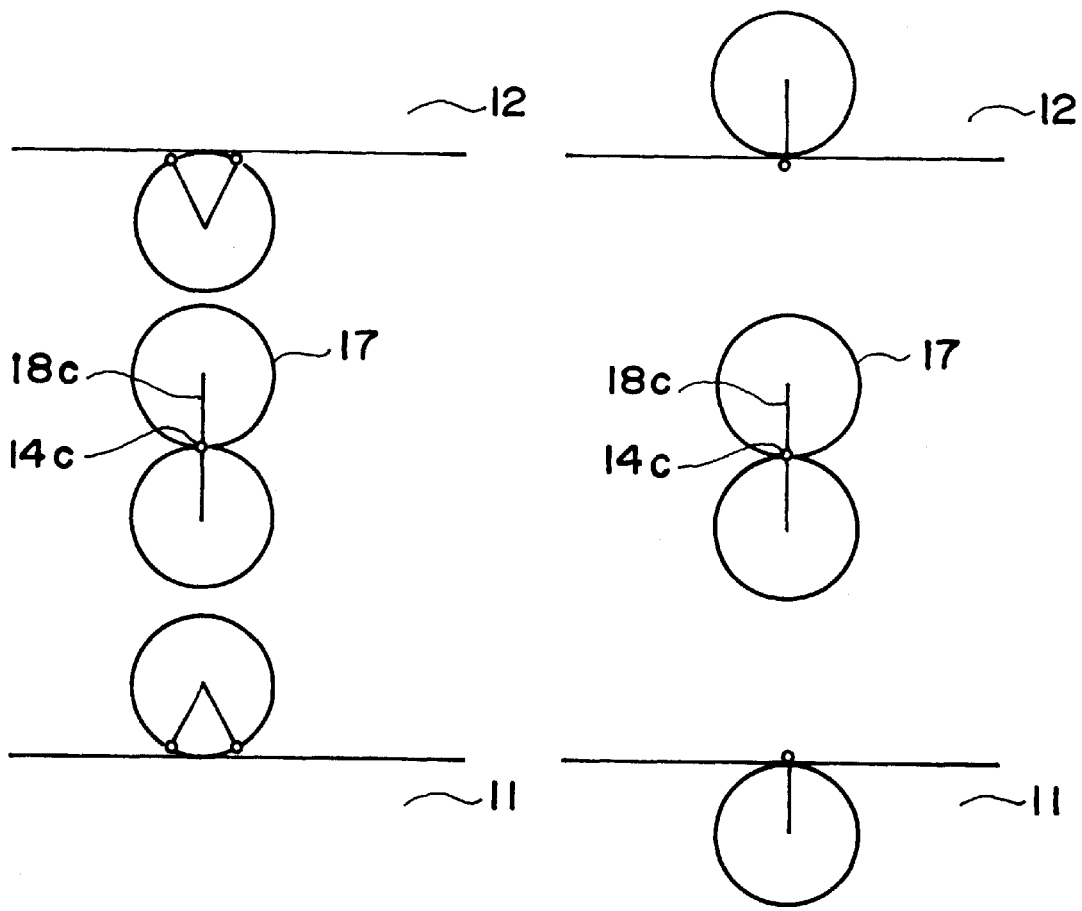

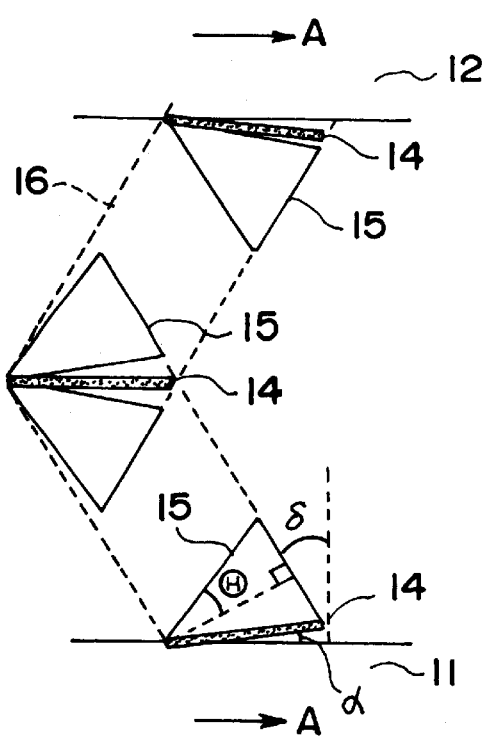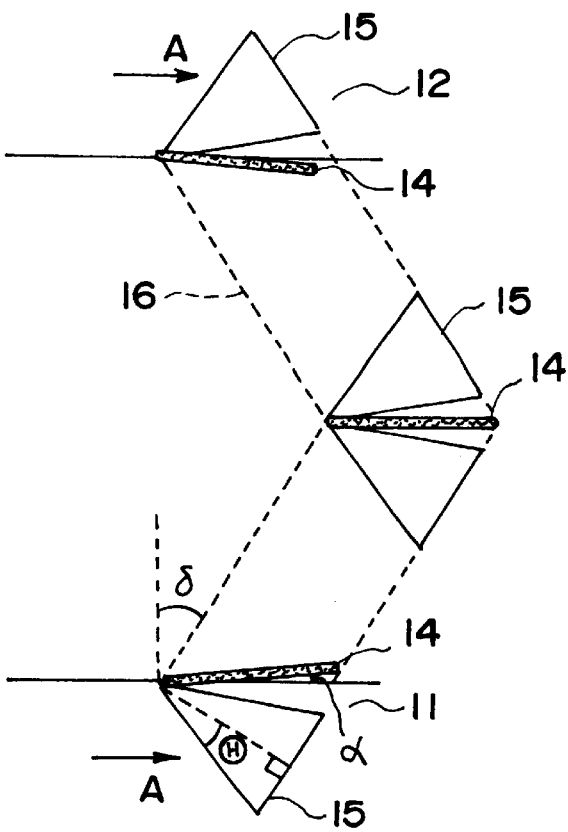
C1 ALIGNMENT
($Ⓗ < δ$)
C2 ALIGNMENT
($Ⓗ < δ$)
FIG. 5A
FIG. 5B

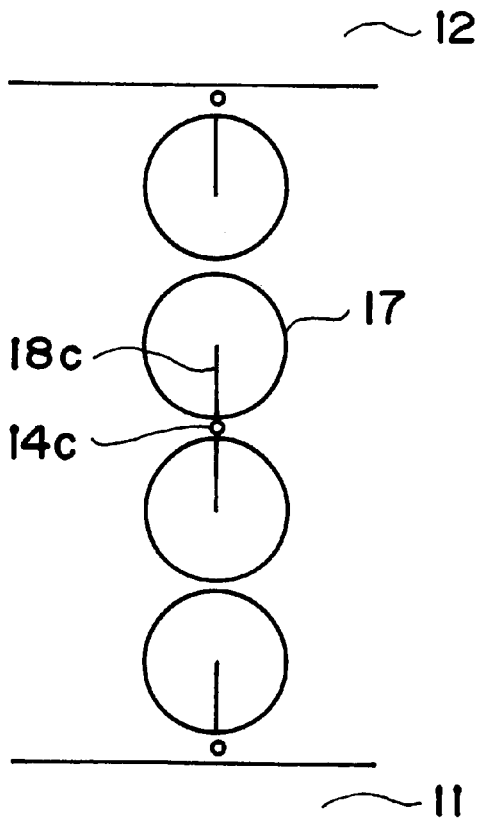
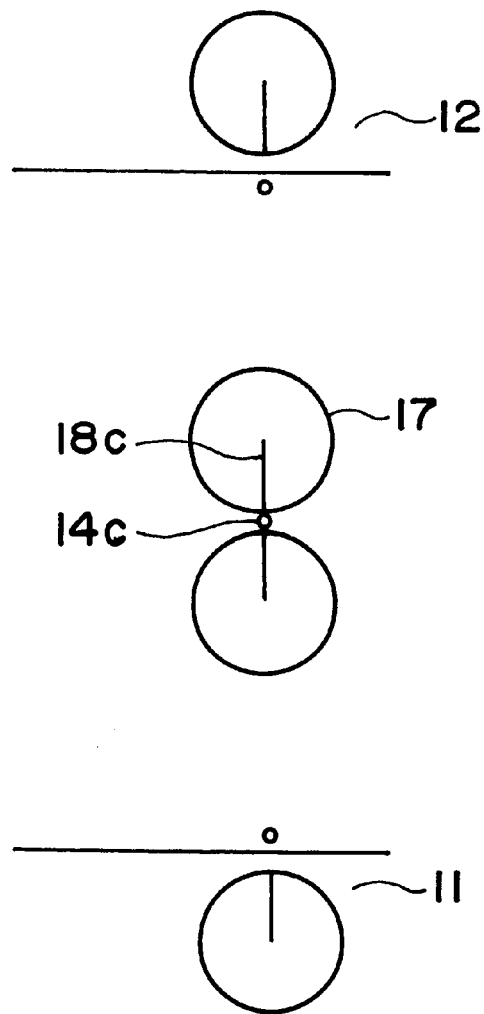
C1 ALIGNMENT
($H$) < $\delta$
C2 ALIGNMENT
($H$) < $\delta$
FIG. 6A
FIG. 6B

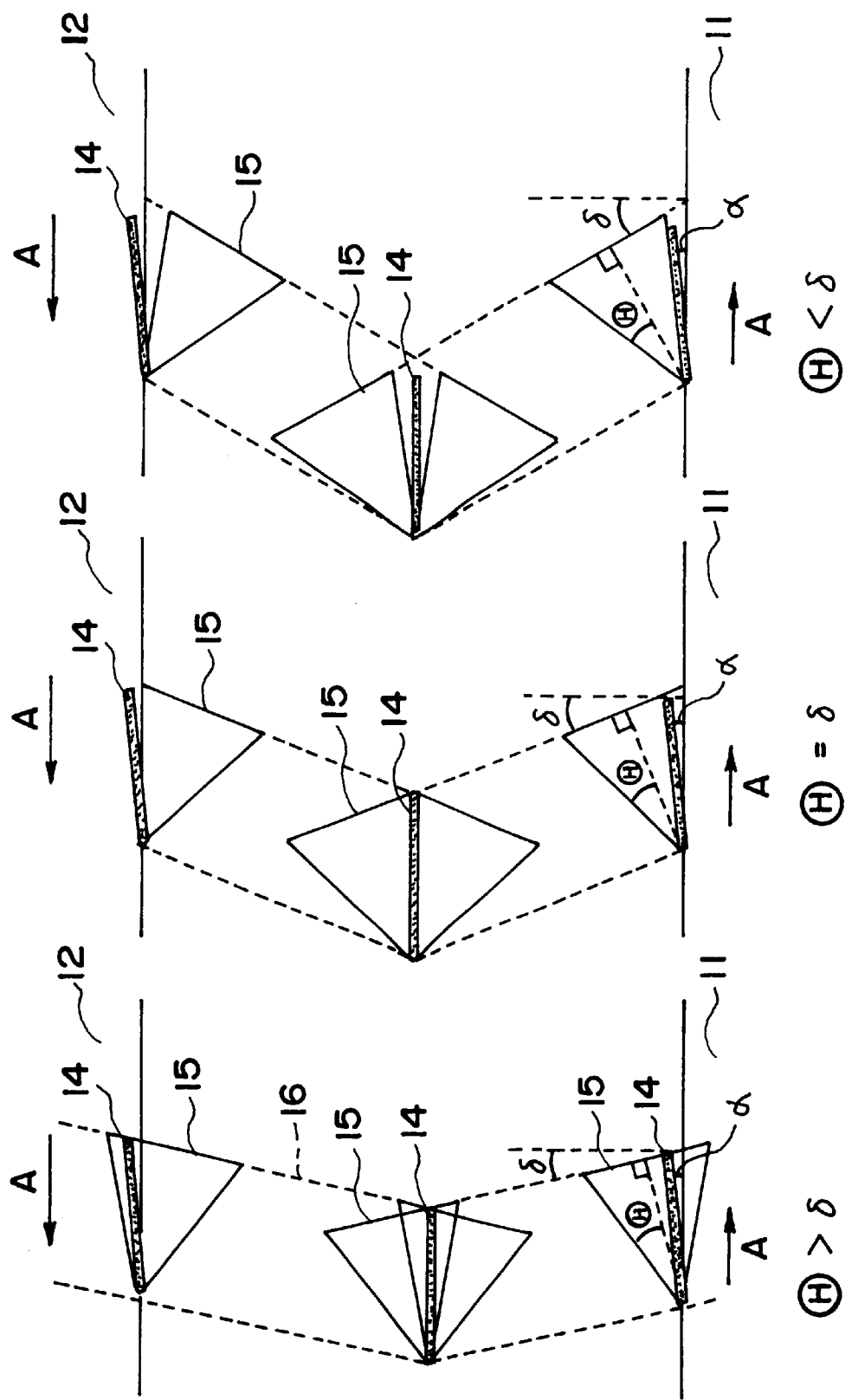

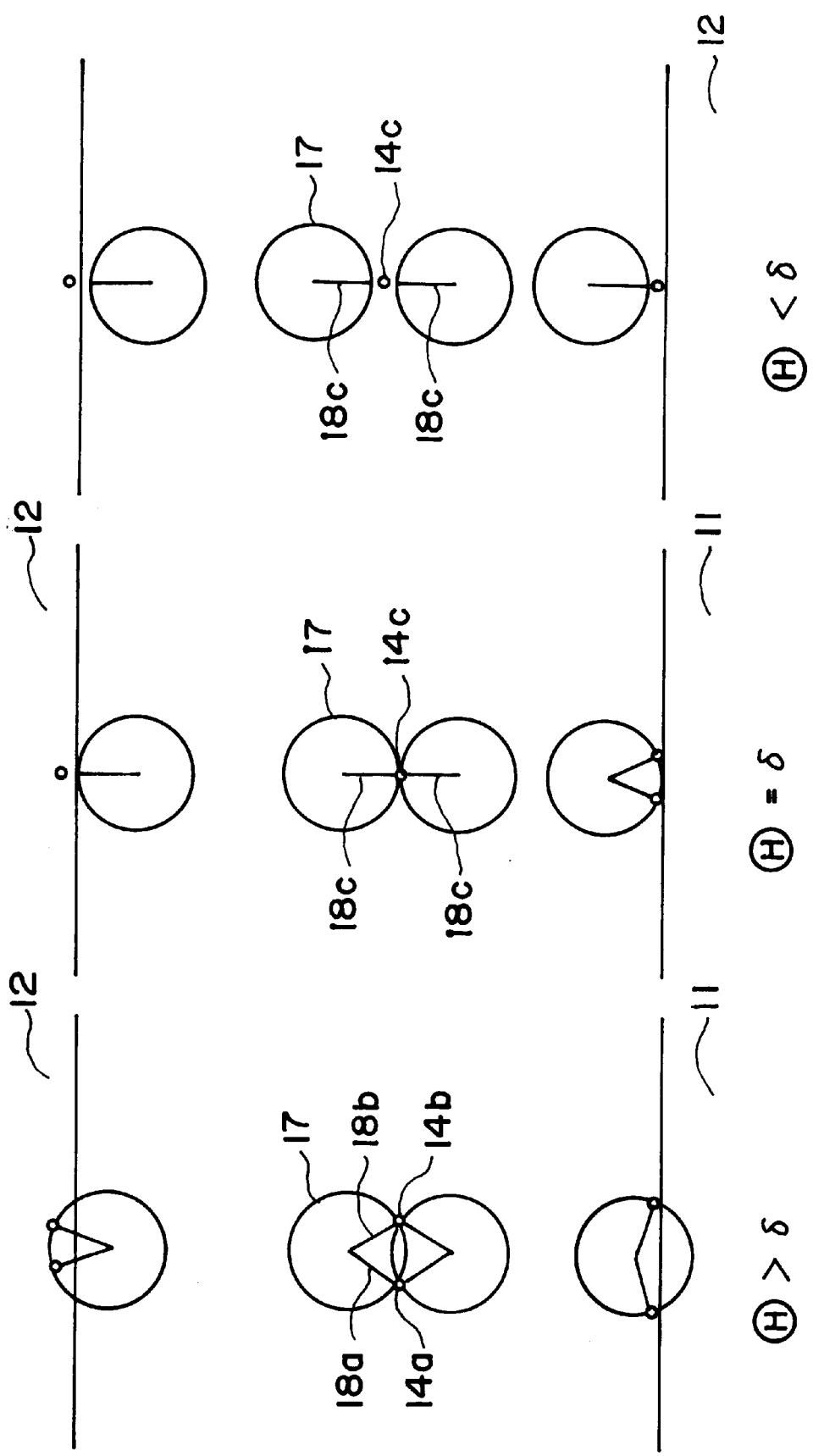

LIQUID CRYSTAL DEVICE AND LIQUID CRYSTAL DISPLAY APPARATUS HAVING A CHEVRON STRUCTURE IN MONOSTABLE ALIGNMENT

FIELD OF THE INVENTION AND RELATED ART

The present invention relates to a liquid crystal device for use in light-valves for flat-panel displays, projection displays, printers, etc., and a liquid crystal display apparatus including the liquid crystal device. The present invention also relates to an aligning method of a liquid crystal in the liquid crystal device and a process for producing the liquid crystal device.

As a type of a nematic liquid crystal display device used heretofore, there has been known an active matrix-type, a liquid crystal device wherein each pixel is provided with an active element (e.g., a thin film transistor (TFT)).

As a nematic liquid crystal material used for such an active matrix-type liquid crystal device using a TFT, there has been presently widely used a twisted nematic (TN) liquid crystal as disclosed by M. Schadt and W. Helfrich, "Applied Physics Letters", Vol. 18, No. 4 (Feb. 17, 1971), pp. 127–128.

In recent years, there has been proposed a liquid crystal device of In-Plain Switching mode utilizing an electric field applied in a longitudinal direction of the device, thus improving a viewing angle characteristic being problematic in TN-mode liquid crystal displays. Further, a liquid crystal device of a super twisted nematic (STN) mode without using the active element (TFT etc.) has also be known as a representative example of the nematic liquid crystal display device.

Accordingly, the nematic liquid crystal display device includes various display or drive modes. In any mode however, the resultant nematic liquid crystal display device has encountered a problem of a slow response speed of several ten milliseconds or above.

In order to solve the above-mentioned difficulties of the conventional types of nematic liquid crystal devices, a liquid crystal device using a liquid crystal exhibiting bistability ("SSFLC", Surface Stabilized FLC), has been proposed by Clark and Lagerwall (Japanese Laid-Open Patent Application (JP-A) 56-107216, U.S. Pat. No. 4,367,924). As the liquid crystal exhibiting bistability, a chiral smectic liquid crystal or a ferroelectric liquid crystal (FLC) having chiral smectic C phase (SmC*) is generally used. Such a chiral smectic (ferroelectric) liquid crystal has a very quick response speed because it causes inversion switching of liquid crystal molecules by the action of an applied electric field on spontaneous polarizations of their liquid crystal molecules. In addition, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

In recent years, as another liquid crystal material, an antiferroelectric liquid crystal showing tristability (tristable states) has caught attention. Similarly as in the ferroelectric liquid crystal, the antiferroelectric liquid crystal causes molecular inversion switching due to the action of an applied electric field on its spontaneous polarization, thus providing a very high-speed responsiveness. This type of the liquid crystal material has a molecular alignment (orientation) structure wherein liquid crystal molecules cancel or counterbalance their spontaneous polarizations each other under no electric field application, thus having no spontaneous polarization in the absence of the electric field.

The above-mentioned ferroelectric and antiferroelectric liquid crystal causing inversion switching based on spontaneous polarization are liquid crystal materials assuming smectic phase (chiral smectic liquid crystals). Accordingly, by using these liquid crystal materials capable of solving the problem of the conventional nematic liquid crystal materials in terms of response speed, it has been expected to realize a smectic liquid crystal display device.

As described above, the (anti-)ferroelectric liquid crystal has been expected to be suitable for use in displays exhibiting a high-speed response performance in the near future.

In the case of the above-mentioned device (cell) using an SSFLC, however, the device can basically effect only a display of two (display) levels, thus being difficult to effect a gradation display in each pixel.

In recent years, in order to allow a mode of controlling various gradation levels, there have been proposed liquid crystal devices using a specific chiral smectic liquid crystal, such as a ferroelectric liquid crystal of a short pitch-type, a polymer-stabilized ferroelectric liquid crystal or an anti-ferroelectric liquid crystal showing no threshold (voltage) value. However, these devices have not been put into practical use sufficiently.

SUMMARY OF THE INVENTION

In view of the above-mentioned circumstances, an object of the present invention is to provide a liquid crystal device using a liquid crystal having chiral smectic C phase, capable of performing a gradation level control.

Another object of the present invention is to provide a liquid crystal display apparatus including the liquid crystal device.

According to the present invention, there is provided a liquid crystal device, comprising:
  a pair of oppositely disposed substrates and a liquid crystal having chiral smectic C phase disposed therebetween, each of the substrates having thereon an electrode for applying a voltage to the liquid crystal, at least one of the substrates being provided with a uniaxial alignment axis for aligning the liquid crystal,
  wherein the liquid crystal is placed in an alignment state in chiral smectic C phase such that:
    (a) the liquid crystal comprises smectic molecular layers forming a chevron structure,
    (b) under no electric field application, the liquid crystal has an average molecular axis substantially in alignment with the uniaxial alignment axis and/or a bisector of a maximum angle formed between two extreme molecular axes established under electric field application, and
    (c) under electric field application, the liquid crystal provides an effective tilt angle and a transmittance that continuously changed depending on an electric field applied thereto.

According to the present invention, there is also provided a liquid crystal display apparatus including the liquid crystal device, a drive circuit for driving the liquid crystal device and a light source.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A an 1B are illustrations of liquid crystal molecules and a chevron layer structure formed thereby in C1 alignment (where $\text{\textcircled{H}}>\delta$) and C2 alignment ($\text{\textcircled{H}}>\delta$), respectively, in an SSFLC-type device.

FIGS. 2A and 2B are illustrations of positions of C-directors in the C1 alignment shown in FIG. 1A and the C2 alignment shown in FIG. 1B, respectively.

FIGS. 3A and 3B and FIGS. 5A and 5B are respectively illustrations of liquid crystal molecules and a chevron layer structure formed thereby in C1 alignment (FIGS. 3A and 5A) and C2 alignment (FIGS. 3B and 5B) when $\text{\textcircled{H}}=\delta$ (FIGS. 3A and 3B9 and $\text{\textcircled{H}}<\delta$ (FIGS. 5A and 5B), respectively, in the liquid crystal device according to the present invention.

FIGS. 4A and 4B and FIGS. 6A and 6B are illustrations of positions of C-directors in the alignment states shown in FIGS. 3A and 3B and FIGS. 5A and 5B, respectively.

FIGS. 7A, 7B and 7C are illustrations of liquid crystal molecules and a chevron layer structure formed thereby in the cases of $\text{\textcircled{H}}>\delta$ (FIG. 7A), $\text{\textcircled{H}}\leqq\delta$ (FIG. 7B) and $\text{\textcircled{H}}>\delta$ (FIG. 7C), respectively, in another embodiment of the SSFLC device (FIG. 7A) and the liquid crystal device of the present invention (FIGS. 7B and 7C), respectively.

FIGS. 8A, 8B and 8C are illustrations of positions of C-directors in the alignment states shown in FIGS. 7A, 7B and 7C, respectively.

DETAILED DESCRIPTION OF THE PREFERRED EMBODIMENTS

Figure 9:
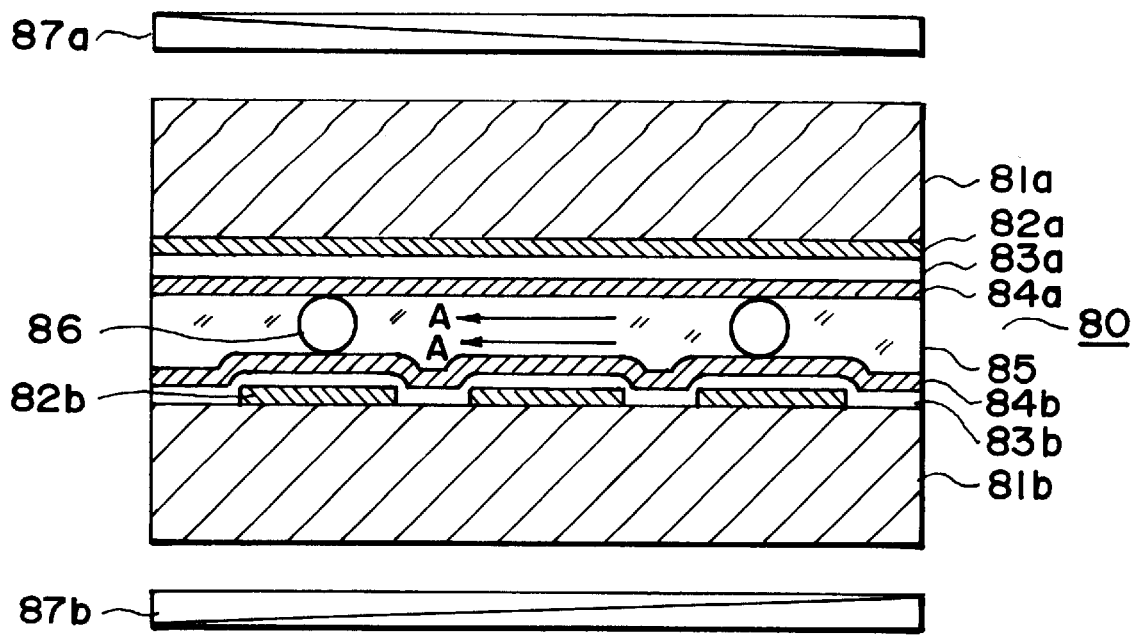
FIG. 9 is a schematic sectional view of an embodiment of the liquid crystal device of the present invention.

In the liquid crystal device according to the present invention, liquid crystal molecules constituting a liquid crystal have an average molecular axis, in chiral smectic C phase under no electric field application, which is substantially aligned with an average uniaxial aligning treatment axis and/or a bisector of a maximum angle formed between two extreme molecular axes established under application of electric fields of different polarities to the liquid crystal, respectively, and under electric field application, provide an effective tilt angle and a transmittance (or transmitted light intensity) that continuously change (increase or decrease) depending on an intensity of an electric field applied thereto, thus allowing a gradation display.

Herein, a direction of the "average uniaxial aligning treatment axis" means a uniaxial aligning treatment axis direction in the case where only one of the pair of substrates is subjected to a uniaxial aligning treatment or a direction of two parallel uniaxial aligning treatment axes in the case where both of the pair of substrates are subjected to a uniaxial aligning treatment so that their uniaxial aligning treatment axes are parallel to each other and in the same direction or opposite directions (parallel relationship or anti-parallel relationship). Further, in the case where both of the substrates are subjected to a uniaxial aligning treatment so that their uniaxial aligning treatment axes intersect each other at a crossing angle, the "average uniaxial aligning treatment axis" direction means a direction of a bisector of the uniaxial aligning treatment axes (a half of the crossing angle).

Hereinbelow, an alignment state and a switching mechanism of liquid crystal molecules constituting a liquid crystal used in the liquid crystal device of the present invention will be described by contrast with those of the above-mentioned SSFLC-type device with reference to FIGS. 1–8.

In the conventional SSFLC-type device, a liquid crystal assuming chiral smectic phase is sandwiched between a pair of oppositely disposed substrates to provide the liquid crystal with two (optically) stable states substantially parallel to the substrates, thus developing a bistability or a memory characteristic.

FIGS. 1A and 1B are schematic illustrations of liquid crystal molecules and a layer structure formed thereby in the SSFLC-type device.

Referring to FIGS. 1A and 1B, a liquid crystal 13 sandwiched between a pair of parallel substrates 11 and 12 includes a plurality of liquid crystal molecules 14. The liquid crystal molecules 14 in the vicinity of boundaries with the substrates form a pretilt angle $\alpha$, the direction of which is such that the liquid crystal molecules 14 raise a forward end up (i.e., spaced from the substrate surface) in the directions of uniaxial aligning treatment indicated by arrows A, respectively. I these figures, the uniaxial aligning treatment axis directions A of the pair of substrates 11 and 12 are parallel to each other and in an identical direction. Between the pair of substrates 11 and 12, the liquid crystal molecules 14 form each smectic (molecular) layer 16 having a chevron structure where the smectic layer 16 is bent at a mid point between the substrates (hereinbelow, referred to as a "bending point") and provides a layer inclination angle $\delta$ with respect to a normal to the substrates. These liquid crystal molecules 14 cause switching between two stable states under electric field application and under no electric field application, are stably present at a wall surface of a virtual cone 15 having an apex angle $2\text{\textcircled{H}}$ ($\text{\textcircled{H}}$: a tilt angle intrinsic to the liquid crystal material used).

As shown in FIGS. 1A an 1B, the liquid crystal 13 between the substrates 11 and 12 can assume different two alignment states depending on the pretilt directions of the liquid crystal molecules 14 in the vicinity of the substrate surface and the bending directions of the chevron structures of the smectic layers 16 between the substrates 11 and 12.

Herein, the alignment state shown in FIG. 1A is referred to as a "C1 alignment (state)" and the alignment state shown in FIG. 1B is referred to a a "C2 alignment (state)", respectively.

In both the C1 and C2 alignment states, all the liquid crystal molecules 14 can assume two (optically) stable states within the cone 15 in a thickness direction between the substrates of the device including the bending points under no electric field application by generally satisfying a relationship of $\textcircled{H} > \delta$, thus realizing bistable states.

FIGS. 2A and 2B are views for illustrating positions of C-directors (projections of the liquid crystal molecules on a circular base 17 of the virtual cone 15) in the C1 alignment shown in FIG. 1A and the C2 alignment shown in FIG. 1B, respectively.

Referring to FIGS. 2A and 2B, each of the liquid crystal molecules may assume bistable states 14*a* and 14*b* (projections 18*a* and 18*b*) at any position between the substrates 11 and 12.

In the above (SSFLC-type) device wherein the liquid crystal assumes a bistability (bistable states), a pair of polarizers are disposed so that one of the polarizers is aligned with one of two molecular axes providing the two (optically) stable states, thus effecting a switching between the two stable states (bistable states) to allow a black (dark) and white (bright) display. In this case, the switching (between the two stable states) is performed through formation of a domain of one of the two stable states from the other stable state, i.e., in accompanied with formation and extinction of domain walls.

On the other hand, in the liquid crystal device of the present invention, liquid crystal molecules in chiral smectic C phase form smectic molecular layers having a chiral chevron structure providing a layer inclination angle δ (i.e., $\textcircled{H} \leq \delta$).

FIGS. 3–6 illustrate such alignment states satisfying $\textcircled{H} \leq \delta$, respectively (wherein respective reference numerals and symbols have the same meanings as in FIGS. 1 and 2).

Specifically, FIGS. 3A and 3B illustrate liquid crystal molecules and chevron structures in C1 alignment and C2 alignment, respectively, in the case of $\textcircled{H} = \delta$ (the case where the tilt angle $\textcircled{H}$ is substantially identical to the layer inclination angle δ, e.g., a difference between the angles $\textcircled{H}$ and δ is below 0.1 deg.), and FIGS. 5A and 5B illustrate those in the case of $\textcircled{H} > \delta$, respectively.

FIGS. 4A, 4B, 6A and 6B illustrate positions of C-directors in the alignment states shown in FIGS. 3A, 3B, 5A and 5B, respectively.

Referring to FIGS. 3A, 3B, 4A and 4B (the case of $\textcircled{H} = \delta$), under no electric field application, C-directions 18*c* of the liquid crystal molecules are present at positions of π/2 or –π/2 based on a horizontal direction within the circular base 17 of the cone 15 at at least the bending portion of the smectic layer 16 having the chevron structure. In this state, a molecular alignment vector (liquid crystal molecule) 14 is in alignment with a projection of the normal direction axis of the smectic molecular layers onto the substrate surface (i.e., is substantially in alignment with an average uniaxial aligning treatment axis and/or a bisector of a maximum angle formed between two extreme molecular axes established under electric field application) and is stable only in this (one) direction. This stable alignment state of the liquid crystal molecules is different from that of anti-ferroelectric liquid crystal molecules under no electric field application.

Further, in the case of $\textcircled{H} < \delta$ shown in FIGS. 5A, 5B, 6A and 6B, under no electric field application, it is difficult for a liquid crystal molecule (molecular alignment vector) 14 to be present within the cone 15 at the bending portion of the smectic layer 16 having the chevron structure, irrespective of the (C1 and C2) alignment states. In this case, the liquid crystal molecules are placed in an unstable alignment state in terms of an energy (state) but as shown in FIGS. 6A and 6B, a C-director 18*c* is present at a position of π/2 or –π/2 (based on a horizontal direction within the circular base 17 of the cone 15). As a result, positions of the liquid crystal molecule 14 and the cone 15 approach nearest to each other, so that the molecular alignment vector 14 is aligned with a projection of the normal direction axis of the smectic layer (i.e., is substantially aligned with an average uniaxial aligning treatment axis and/or a bisection of a maximum angle formed between two extreme molecular axes established under electric field application), thus being stable only in this (one) direction. This stable alignment state of the liquid crystal molecules shown in FIGS. 5A, 5B, 6A and 6B is also different from that of anti-ferroelectric liquid crystal molecules under no electric field application.

When the above-mentioned chevron structure where the layer inclination angle δ in the cell thickness direction is a certain value as shown in FIGS. 5A, 5B, 6A and 6B is assumed, the liquid crystal molecules at the bending portion of the chevron structure are deviated (shifted) from the cone surface to result in an energistically disadvantageous (unstable) structure. For this reason, in an actual chevron structure, the liquid crystal molecules are considered to be stabilized by providing their layer structure with a somewhat bending characteristic.

In the alignment states as shown in FIGS. 3–6, under application of an electric field, the liquid crystal molecules 14 continuously change their positions within the cone 15 depending on an intensity (magnitude) and a polarity of the applied electric field, thus effecting switching so as to change their effective tilt angles thereby to change a resultant transmittance.

Referring again to FIGS. 1A, 1B, 2A and 2B, in order to effect switching between bistable states of the liquid crystal molecules of the SSFLC, the liquid crystal molecules are required to cross (overcome) an energy barrier of a certain level. Particularly, in the case of switching of the SSFLC, the energy barrier becomes very large since the switching is accompanied with formation and extinction of domains (domain walls) as described above, thus consequently requiring a high driving voltage.

On the other hand, in the alignment states shown in FIGS. 3A to 6B, there is no energy barrier at the time of switching from the monostabilized (only one stable) state of the liquid crystal molecules under electric field application, so that an analog-like stable state is present depending on a magnitude of an applied voltage (electric field), and the applied voltage and the resultant stable molecular position stand in one-to-one (corresponding) relationship, thus realizing inversion switching in a continuous manner without forming a domain.

Further, at the time of switching of the liquid crystal molecules under electric field application, the SSFLC in the alignment states shown in FIGS. 1A and 1B shows a voltage-transmittance (V-T) curve with a hysteresis.

On the other hand, the liquid crystal in the alignment states shown in FIGS. 3–6 used in the present invention shows a switching characteristic such that a resultant V-T curve includes a V-shaped line with no hysteresis based on the point of V=0 as its center. This may be attributable to the switching with no formation and extinction of domain walls different from the case of the SSFLC, thus being not readily affected by a previous state (switching history).

As a result, according to the liquid crystal device of the present invention providing the alignment states shown in FIGS. 3–6 ($\textcircled{H} \leq \delta$), it is possible to provide a switching characteristic with lower power consumption, higher switching speed and hysteresis-less V-shaped V-T curve when compared with the SSFLC-type device even if the same liquid crystal material is used, thus resulting in a liquid crystal device capable of readily performing an analog gradation drive.

FIGS. 7 and 8 (7A to 8C) illustrate alignment states of liquid crystal molecules in the case where directions A of uniaxial aligning treatment axes as to a pair of substrates 11 and 12 are parallel but oppositely directed (i.e., in an anti-parallel relationship). Specifically, FIGS. 7A–7C show states of liquid crystal molecules and their chevron structures and FIGS. 8A–8C shows positions of C-directors corresponding to the states of FIGS. 7A–7C, respectively. Further, FIGS. 7A and 8A are concerned with the SSFLC satisfying ⒽH>δ; FIGS. 7B and 8B are concerned with the liquid crystal used in the present invention satisfying ⒽH=δ, and FIGS. 7C and 8C are concerned with the liquid crystal used in the present invention satisfying ⒽH>δ.

Referring to these figures, the liquid crystal molecules 14 in the alignment states shown in FIGS. 7A and 8A are placed in bistable states within the cone 15. On the other hand, similarly as in the cases of FIGS. 3–6, the liquid crystal molecules 14 in the alignment states shown in FIGS. 7B and 8B and FIGS. 7C and 8C are not readily present particularly at two positions within the cone 15 at the bending portion of the smectic layer 16 having the chevron structure, thus losing the bistability to provide a mono-stable state 14e (projection 18c)). In these alignment states (FIGS. 7B and 8B and 7C and 8C) under application of an electric field, the liquid crystal molecules 14 cause switching so that their positions continuously change with the cone 15 depending on an intensity and a polarity of the applied electric field.

Incidentally, in the vicinity of boundaries of the substrates 11 and 12 in FIGS. 7A–7C and 8A–8C, the cones 15 and the positions of the liquid crystal molecules 14 are illustrated on the premise that the layer inclination angle δ and the tilt angle Ⓗ are each kept at a certain value, thus not necessarily corresponding to actual alignment states of the liquid crystal molecules.

Hereinbelow, a preferred embodiment of the liquid crystal device of the present invention will be described with reference to FIG. 9.

FIG. 9 shows a schematic sectional view of a liquid crystal device 80 according to the present invention.

The liquid crystal device 80 includes a pair of substrates 81a and 81b; electrodes 82a and 82b disposed on the substrates 81a and 81b, respectively; insulating films 83a and 83b disposed on the electrodes 82a and 82b, respectively; alignment control films 84a and 84b disposed on the insulating films 83a and 83b, respectively; a liquid crystal 85 disposed between the alignment control films 84a and 84b; a spacer 86 disposed together with the liquid crystal 85 between the alignment control films 84a and 84b; and a pair of polarizers 87a and 87b sandwiching the pair of substrates 81a and 81b with polarizing axes perpendicular to each other (cross-nicol relationship).

The liquid crystal 85 shows chiral smectic phase.

Each of the substrates 81a and 81b comprises a transparent material, such as glass or plastics, and is coated with, e.g., a plurality of stripe electrodes 82a (82b of $In_2O_3$ or ITO (indium tin oxide) for applying a voltage to the liquid crystal 85). These electrodes 82b and 82b intersect each other to form a matrix electrode structure, thus providing a simple matrix-type liquid crystal device. As a modification of the electrode structure, one of the substrates 81a and 81b may be provided with a matrix electrode structure wherein dot-shaped transparent electrodes are disposed in a matrix form and each of the transparent electrodes is connected to a switching element, such as a TFT (thin film transistor) or MIM (metal-insulator-metal), and the other substrate may be provided with a counter (common) electrodes on its entire surface, thus constituting an active matrix-type liquid crystal device.

On the electrodes 82a and 82b, the insulating films 83a and 83b, e.g., of $SiO_2$, $TiO_2$ or $Ta_2O_5$ having a function of preventing an occurrence of short circuit may be disposed, respectively, as desired.

On the insulating films 83a and 83b, the alignment control films 84a and 84b are disposed so as to control the alignment state of the liquid crystal 85 contacting the alignment control films 84a and 84b. At least one of (preferably both of) the alignment control films 84a and 84b is subjected to a uniaxial aligning treatment (e.g., rubbing). Such an alignment control film 84a (84b) may be prepared by forming a film of an organic material (such as polyimide, polyimideamide, polyamide or polyvinyl alcohol through wet coating with a solvent, followed by drying and rubbing (e.g., in the direction of arrows A in FIG. 9) or by forming a deposited film of an inorganic material through an oblique vapor deposition such that an oxide (e.g., SiO) or a nitrile is vapor-deposited onto a substrate in an oblique direction with a prescribed angle to the substrate.

The alignment control films 84a and 84b may appropriately controlled to provide liquid crystal molecules of the liquid crystal 85 with a prescribed pretilt angle a (an angle formed between the liquid crystal molecule and the alignment control film surface at the boundaries with the alignment control films) by changing the material and treating conditions (of the uniaxial aligning treatment). In the present invention, even in the alignment states shown in FIGS. 3–7 (Ⓗ≦δ), particularly in the C1 alignment state, the liquid crystal molecules in the vicinity of the boundaries with the substrates (alignment control films) can provide bistable states if the pretilt angle α is large. Accordingly, the pretilt angle a may preferably be small (e.g., at most 10 degrees, more preferably at most 5 degrees) in the present invention.

In the case where both of the alignment control films 84a and 84b are subjected to the uniaxial aligning treatment (rubbing), the respective uniaxial aligning treatment (rubbing) directions may appropriately be set in a parallel relationship, an anti-parallel relationship or a crossed relationship providing a crossing angle of at most 45 degrees, depending on the liquid crystal material used.

The substrates 81a and 81b are disposed opposite to each other via the spacer 86 comprising e.g., silica beads for determining a distance (i.e., cell gap) therebetween, preferably in the range of 0.3 –10 μm, in order to provide a uniform uniaxial aligning performance and such an alignment state that an average molecular axis of the liquid crystal molecules under no electric field application is substantially aligned with an average uniaxial aligning treatment axis (a bisector of two uniaxial aligning treatment axes) although the cell gap varies its optimum range and its upper limit depending on the liquid crystal material used.

In addition to the spacer 86, it is also possible to disperse adhesive particles of a resin (e.g., epoxy resin) between the substrates 81a and 81b (not shown in FIG. 9) in order to improve adhesiveness therebetween and an impact (shock) resistance of the liquid crystal having chiral smectic C phase (SmC*).

In the liquid crystal device 80 having the above-mentioned structure according to the present invention, by appropriately setting and controlling various factors including a material and composition for the liquid crystal 85 having SmC*, a material and treating conditions for the alignment control films 84a and 84b and other device structures, it is possible to provide the liquid crystal 85 with an alignment state such that:

(i) smectic molecular layers of the liquid crystal 85 having SmC* provide a chevron structure, (ii) the tilt angle $H$ of the liquid crystal 85 and the layer inclination angle $\delta$ of each of the smectic layers satisfy the following relationship:

$$H \leq \delta,$$

(iii) under no electric field application, liquid crystal molecules of the liquid crystal 85 provide an average molecular axis substantially in alignment with an average uniaxial aligning treatment axis and/or a bisector of a maximum angle formed between two extreme molecular axes established under application of electric fields of different polarities, and (iv) under application of an electric field an effective tilt angle of the liquid crystal 85 continuously changes depending on an applied voltage (electric field).

As a result, when the liquid crystal cell as described above is sandwiched between the pair of polarizers 87a and 87b in a cross-nicol relationship so as to place the cell in the darkest state under no electric field application, a resultant transmitted light intensity (transmittance) can continuously change depending on the applied voltage (electric field).

As the liquid crystal 85 having chiral smectic C phase, the liquid crystal material may appropriately be selected so as to satisfy the above-mentioned relationship: $H \leq \delta$ when disposed between the pair of substrates.

For example, the liquid crystal material may be formulated as a composition by appropriately selecting its components from hydrocarbon-based liquid crystals having a phenyl-pyrimidine skeleton so as to satisfy $H \leq \delta$.

In a preferred embodiment, a liquid crystal composition having a positive dielectric anisotropy ($\Delta\epsilon>0$) at least in its phase transition series, more preferably in its smectic phase may desirably be subjected to, e.g., application of an electric field (electric field application treatment), thus suitably placing the liquid crystal composition in an alignment state in chiral smectic C phase such that smectic molecular layers provide a chevron structure satisfying the above-mentioned condition $H \leq \delta$.

More specifically, when a sufficiently large electric field is applied to a liquid crystal cell (device) wherein a liquid crystal material having a large spontaneous polarization (Ps) in chiral smectic phase and providing a chevron structure as its smectic layer structure is employed, a change in layer structure (of smectic molecular layers) is generally induced by the action of the spontaneous polarization and the applied electric field in combination. As a result, it has been known that the (smectic) layer structure is changed (deformed) from the chevron structure to a bookshelf (or quasi-bookshelf) structure having no or substantially no bending portion (i.e., providing substantially no or small layer inclination angle). It has also been empirically known that such a layer deformation (layer structure change) is liable to occur with an increased Ps value of the liquid crystal material used.

The change in layer structure to the bookshelf structure under electric field application increase an effect of the applied electric field (E) and the Ps in combination (i.e., E·Ps·cosδ) since an effective Ps value in the direction of the electric field application is represented by Ps·cosδ, so that the deformation of the chevron structure is induced so as to minimize the layer inclination angle per se to result in a (quasi-)bookshelf structure.

On the other hand, in the present invention, e.g., in the case where a liquid crystal composition showing a phase transition series of isotropic phase (Iso), cholesteric phase (Ch), smectic A phase (SmA) and chiral smectic C phase (SmC*) on temperature decrease is injected into a liquid crystal having cell structure including a pair of substrates provided with parallel uniaxial aligning treatment axes in its isotropic phase (Iso) and cooled therefrom to its chiral smectic C phase (SmC*) without applying an external field such as an ordinary electric field, a chevron structure is generally formed through (i) an orientation (alignment) of liquid crystal molecules in Ch such that they are aligned in parallel with the substrates and provide respective average (longer) molecular axes uniformly aligned in one direction, (ii) formation of a smectic layer structure such that the aligned (oriented) liquid crystal molecules form a (smectic) layer structure perpendicular to the substrates by cooling to SmA, and (iii) formation of chevron structure by cooling to SmC*.

When the layer structure used shows a temperature region in which it exhibits a positive dielectric anisotropy (positive $\Delta\epsilon$) and is supplied with an electric field, the liquid crystal molecules are uniformly aligned in the electric field application direction to be directed perpendicular to the substrates. Accordingly, if the electric field application is performed while cooling the liquid crystal from Iso to SmA, (smectic) liquid crystal molecules form a layer with an average (longer) molecular axis in alignment with a normal to the layer, thus resulting in an inclined (tilted) layer structure which is not perpendicular to the substrates. Similarly, also in the case of the electric field application in SmA, if the liquid crystal shows a positive $\Delta\epsilon$ in SmA, torque is exerted on the liquid crystal molecules so as to uniformly align the liquid crystal molecules in a direction of the electric field application similarly as in Ch. As a result, the liquid crystal molecules forming the smectic layer structure perpendicular to the substrates are re-aligned (re-oriented) to incline the layer structure. It is further possible to cause the layer inclination state in SmC* under application of the electric field. In this case, however, if the liquid crystal used has a large Ps value, the layer deformation due to the combination effect of the electric field and the Ps is liable to occur. Accordingly, the Ps may preferably be a small value of, e.g., at most 20 (nC/cm²) in ai temperature region in which the above-described electric field is applied. Such a small Ps value is, however, determined relative to a value of (½)·$\Delta\epsilon$·$E^2$ based on an effect in combination of the $\Delta\epsilon$ and the applied electric field (E), thus varying depending on their values employed in the present invention.

As described above, it is possible to provide a layer inclination angle $\delta$ larger than an original (initial) layer inclination angle $\delta_0$ (with no electric field application treatment) by effecting an electric field application treatment in ia (liquid crystal) temperature range in which the liquid crystal used shows a positive $\Delta\epsilon$ (dielectric anisotropy). As a result of the electric field application treatment, it is possible to achieve a layer inclination angle $\delta$ identical to or larger than a tilt angle $H$ of liquid crystal molecules (i.e., $H \leq \delta$), thus realizing a liquid crystal device wherein the liquid crystal molecules are stabilized in the (average) uniaxial aligning treatment direction.

In the present invention, it is also possible to realize the relationship $\delta \leq H$ by applying a pressure to the liquid crystal device (pressure application treatment) in combination with or in place of the electric field application treatment.

In the present invention, the layer inclination angle $\delta$ can be increased to satisfy $\delta \leq H$ in any phase of Ch, SmA and SmC* in principle by effecting the electric field application treatment and/or the pressure application treatment to the liquid crystal device wherein the liquid crystal molecules forming a chevron structure in SmC* are monostabilized under no electric field application.

In a preferred embodiment, the electric field application treatment may be performed in at least one of Ch, SmA and SmC* in the case of a phase transition series of Iso-Ch-SmA-SmC* and in at least one of Ch and SmC* in the case of a phase transition series of Iso-Ch-SmC*. Further, the pressure application treatment may preferably performed in at least one of SmA and SmC* in the case of a phase transition series of Iso-Ch-SmA-SMC*.

In a particularly preferred embodiment, such a electric field (and/or pressure) application treatment ((re-)orientation treatment) may be performed in SmC* since a process load becomes smaller in a lower liquid crystal phase such as SmC* and a possibility of an occurrence of short circuit between the pair of substrates becomes smaller even when impurities (and/or contaminants) are included in the cell (device), thus being suitable for mass production of the liquid crystal device.

In the present invention, the relationship $\text{\textcircled{H}} \leq \delta$ may be satisfied in many case when the liquid crystal material used shows a layer spacing-charging property in SmA phase such that a layer spacing of the liquid crystal material is decreased with a temperature decrease within SmA.

Further, the liquid crystal material used in the present invention may preferably provide a helical pitch (in SmC*) in its bulk state equal to or larger than a value which is two times a cell thickness (or a thickness of the liquid crystal layer).

In the present invention, the above-mentioned liquid crystal device may be used in combination with a drive circuit for driving the liquid crystal device and a light source for the liquid crystal device, thus providing a liquid crystal display apparatus capable of effecting gradation display by utilizing the above-mentioned specific alignment state of the liquid crystal used, particularly such that an effective tilt angle and a resultant transmittance continuously change by application of an electric field to the liquid crystal.

In the liquid crystal display apparatus of the present invention, it is possible to use a substrate provided with, e.g., TFTs, as one of the pair of substrates, thus effecting an active matrix driving based on amplitude modification by using the driving circuit to allow analog-like gradation display.

The values of a tilt angle $\text{\textcircled{H}}$ and an effective tilt angle a referred to herein are based on values measured according to the following methods.

Measurement of Tilt Angle $\text{\textcircled{H}}$

A liquid crystal device including a liquid crystal material (a sample liquid crystal device) is set on a polarizing microscope provided with a photomultiplier and is supplied with a rectangular wave comprising at least saturation voltages of positive and negative polarities and a frequency of 100 Hz. Under application of the rectangular wave, a stage is rotated to find a first extinction position (a position providing the lowest transmittance or transmitted light quantity) and a second extinct position. A tilt angle $\text{\textcircled{H}}$ was measured as a half of the angle between the first and second extinct positions.

Measurement of Effective Tilt Angle

In a similar manner as in above (measurement of $\text{\textcircled{H}}$) first and second extinction positions are obtained except that the applied voltage of the rectangular wave is changed to various values between the saturation voltage and zero volts. An effective tilt angle θa was measured as a half of the angle between the first and second extinct positions.

Hereinbelow, the present invention will be described more specifically based on Examples with reference to FIGS. 10–19.

EXAMPLE 1

A liquid crystal cell was prepared in the following manner.

A pair of 1.1 mm-thick glass substrates each provided with a 700 Å-thick ITO film as a transparent electrode were provided.

On each of the transparent electrodes, a polyimide precursor for forming a polyimide having a recurring unit (PI-a) shown below was applied by spin coating and pre-dried at 80° C. for 5 min., followed by hot-baking at 200° C. for 1 hour to obtain a 50 Å-thick polyimide film.

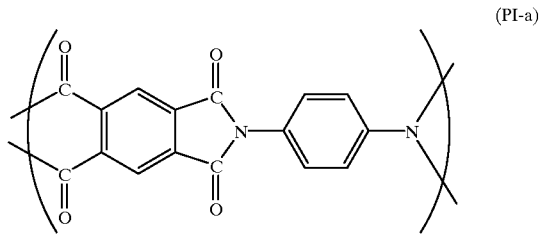

(PI-a)

Each of the thus-obtained polyimide films was subjected to rubbing treatment (as a uniaxial aligning treatment) with a nylon cloth under the following conditions to provide an alignment control film.

Rubbing roller: a 10 cm-dia. roller about which a nylon cloth ("NF-77", mfd. by Teijin K. K.)

Pressing depth: 0.3 mm

Substrate feed rate: 10 cm/sec

Rotation speed: 1000 rpm

Substrate feed: 4 times

Then, on one of the substrates, silica beads (average particle size 1.4 μm) were dispersed and the pair of substrates were applied to each other so that the rubbing treating axes were in parallel with each other and directed in the same direction, thus preparing a blank cell with a uniform cell gap.

When the blank cell was subjected to measurement of a pretilt angle α according to the crystal rotation method, the cell provided a pretilt angle α of 2.0 degrees.

A liquid crystal composition LC-1 was prepared by mixing the following compounds in the indicated proportions.

| Structural formula | wt. parts |
|---|---|
| 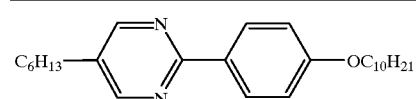 | 49.5 |

-continued

| Structural formula | wt. parts |
|---|---|
| 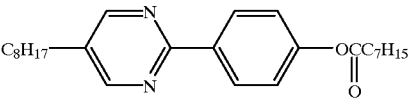 C$_8$H$_{17}$—[pyridine]—[phenyl]—OCC$_7$H$_{15}$ (=O) | 16.5 |
| 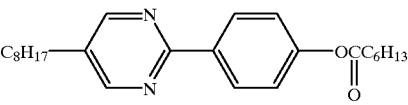 C$_8$H$_{17}$—[pyridine]—[phenyl]—OCC$_6$H$_{13}$ (=O) | 16.5 |
| 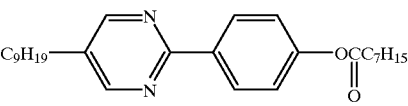 C$_9$H$_{19}$—[pyridine]—[phenyl]—OCC$_7$H$_{15}$ (=O) | 16.5 |
| 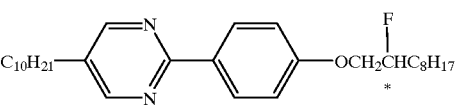 C$_{10}$H$_{21}$—[pyridine]—[phenyl]—OCH$_2$CHC$_8$H$_{17}$ with F substituent, * | 1 |

The thus-prepared liquid crystal composition LC-1 showed the following phase transition series and physical properties.

Phase transition temperature (°C)

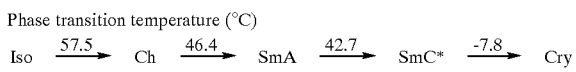

Iso $\xrightarrow{57.5}$ Ch $\xrightarrow{46.4}$ SmA $\xrightarrow{42.7}$ SmC* $\xrightarrow{-7.8}$ Cry Iso: isotropic phase, Ch: cholesteric phase, SmA: smectic A phase, SmC*: chiral smectic C phase, and Cry: crystal phase.

Spontaneous polarization (Ps): 0.57 nC/cm$^2$ (30° C.)
Tilt angle (H): 22.2 degrees (30° C.)
Helical pitch (SmC*): at least 20 μm (30° C.) (roughly calculated value due to a longer pitch)

The liquid crystal composition LC-1 was injected into the above-prepared blank cell in its isotropic liquid state and gradually cooled to a temperature providing chiral smectic C phase to prepare a liquid crystal device (Device A).

When the thus-prepared Device A was subjected to observation of its initial alignment state at 30° C. through a polarizing microscope (magnification=100), the initial alignment state was found to be bistable states comprising two domains in mixture.

The Device A was subjected to application of a rectangular wave (±50 volts, 10 Hz) for 5 min. at 3° C. (electric field application treatment), and then observed through the polarizing microscope. As a result, the alignment state of the liquid crystal composition LC-1 was found to be changed from the bistable states (the mixture of two domains) to a uniform alignment state in which the darkest axis (an axis providing the darkest state) was aligned with the rubbing direction.

After the electric field application treatment, the Device A was subjected to measurement of a transmittance by using a polarizing microscope provided with a photomultiplier while applying a a triangular wave (voltage=0 to ±15 volts, frequency=0.1 Hz) in a state such that the polarizing axis was aligned with the rubbing direction to provide the darkest state.

As a result, it was found that a domainless switching was performed to provide a voltage-transmittance curve (V-T curve) with no hysteresis including a V-shaped line having the darkest point (voltage (V)=0 volt, transmittance (T)=0%) as its center.

Figure 10:
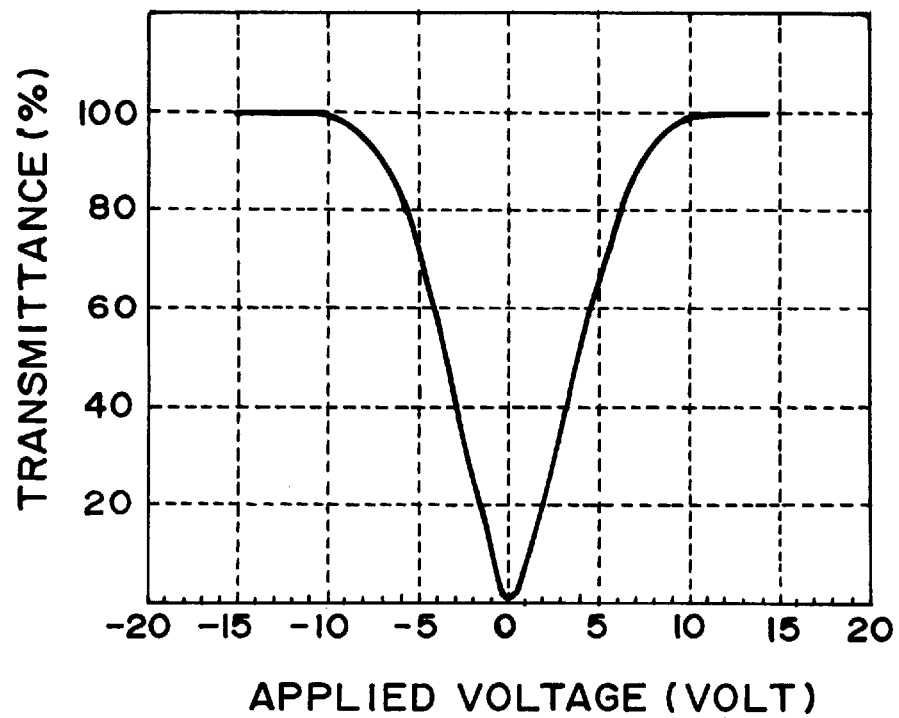
FIGS. 10 and 13 are graphs each showing a voltage-transmittance (V-T) characteristic of the liquid crystal device of the present invention used in Examples 1 and 2 (appearing hereinafter), respectively.

The V-T curve is shown in FIG. 10.

As shown in FIG. 10, the Device A provided a saturation voltage (Vsat) giving a T=100% of a ca. ±10.0 volts.

Further, when the electric field (triangular wave) application was terminated, the molecular axis (original darkest axis) was returned to the original position. Accordingly, in the Device A, it was found that the stablest molecular position was in a direction identical to the rubbing direction.

As apparent from the V-T curve shown in FIG. 10, the Device A showed an optical response (transmittance) which continuously changing (increasing on both the positive voltage side and the negative voltage side) with an increase in applied voltage (as an absolute value).

The Device A was subjected to measurement of an optical response speed (response time) at 30° C. by detecting an optical response under application of a bipolar pulse voltage (V=±6.0 volts, pulse width=16.6 msec) in a right-angle cross-nicol relationship based on a reference transmittance (Tref) taken as 100% under application of ±6 volts.

WHen the Device A under no electric field application was supplied with a voltage of a negative polarity, a response time for increasing a transmittance (T) from 0% to 90% (from a black (dark) state to one of two white (bright) states) was 1.0 msec. Thereafter, the Device A (in one of the white states) was supplied with a voltage of a positive (opposite) polarity to change the alignment state of the liquid crystal molecules to the other white state at a response time (required for causing inversion (switching) from one white state (T=90%) to the other white state (T=90%)) of 1.5 msec. Further, when the positive-polarity voltage application to the device A was terminated, the liquid crystal molecules in the other white state (T=100%) was changed into the black state (T=10%) at a response time of 2.0 msec.

Then, the Device A was subjected to measurement of a layer inclination angle δ (of smectic molecular layers) of the liquid crystal composition LC-1 in the following manner.

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotary cathode-type X-ray diffraction apparatus (available from MAC Science) with CuKa-rays as analyzing rays, and 80 μm-thick microsheets (available from Corning Glass Works) were used as the substrates so as to minimize the X-ray absorption with the glass substrates of the Device A to prepare a (blank) cell for X-ray diffraction analysis.

First, a layer spacing of the liquid crystal composition LC-1 was measured by applying the liquid crystal composition LC-1 in a bulk state onto an 80 μm-thick glass sheet, followed by 2θ/θ scanning in the same manner as in an ordinary powder X-ray diffraction analysis.

Then, into the above-prepared (blank) cell, the liquid crystal composition LC-1 was injected at its isotropic liquid temperature and gradually cooled to room temperature (30° C.), thus preparing an X-ray measurement cell. Thereafter, the X-ray measurement cell was subjected to θscanning white setting an X-ray detector at a position where a diffraction angle (2θ) providing the above-measured layer spacing was obtained, followed by calculation of a layer inclination angle δ at 30° C. in accordance with the method described in the above documents.

Figure 11:
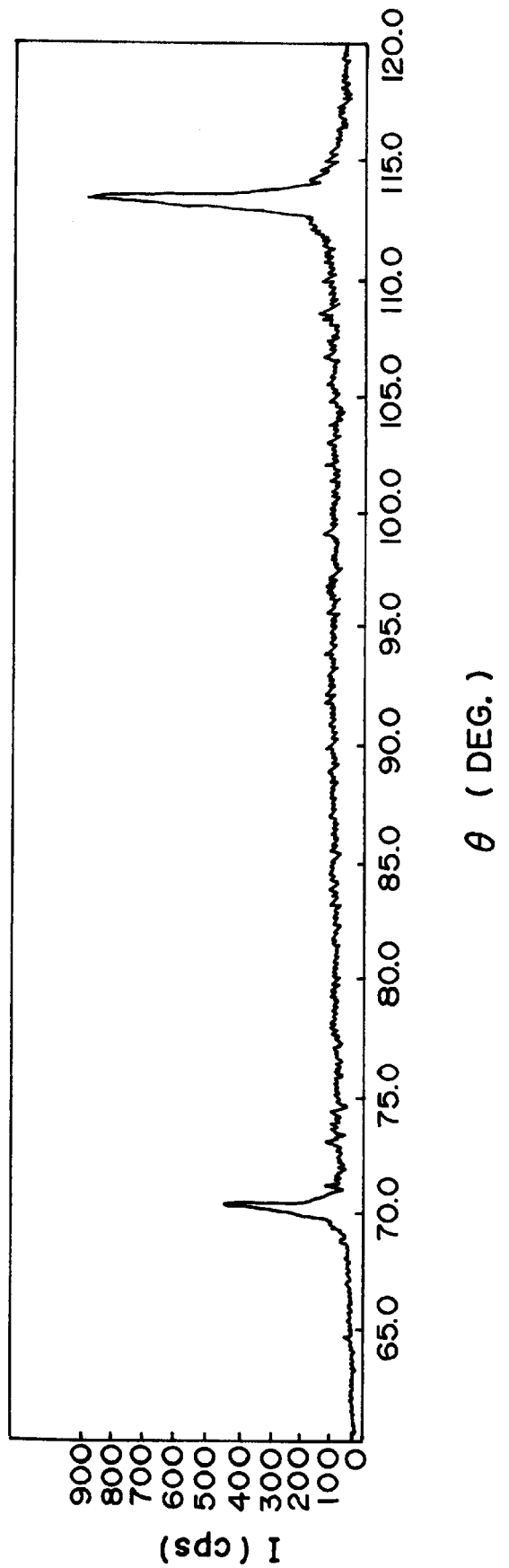
FIGS. 11 and 14 are X-ray diffraction charts for the liquid crystal device used in Examples 1 and 2 before an electric field application treatment, respectively.

As a result of the X-ray diffraction analysis, two sharp peaks were observed at θ=70.3 degrees and θ=113.1 degrees as shown in FIG. 11, so that the liquid crystal composition LC-1 was found to assume a chevron structure providing a layer inclination angle δ of 21.4 degrees in the cell provided with the rubbing axes in a parallel relationship.

Then, the X-ray measurement cell was subjected to electric field application treatment in the same manner as in the Device A (i.e., application of a rectangular wave (±50 volts, 10 Hz) for 5 min. at 30° C.), followed by measurement of a layer inclination angle δ in the same manner as mentioned above.

Figure 12:
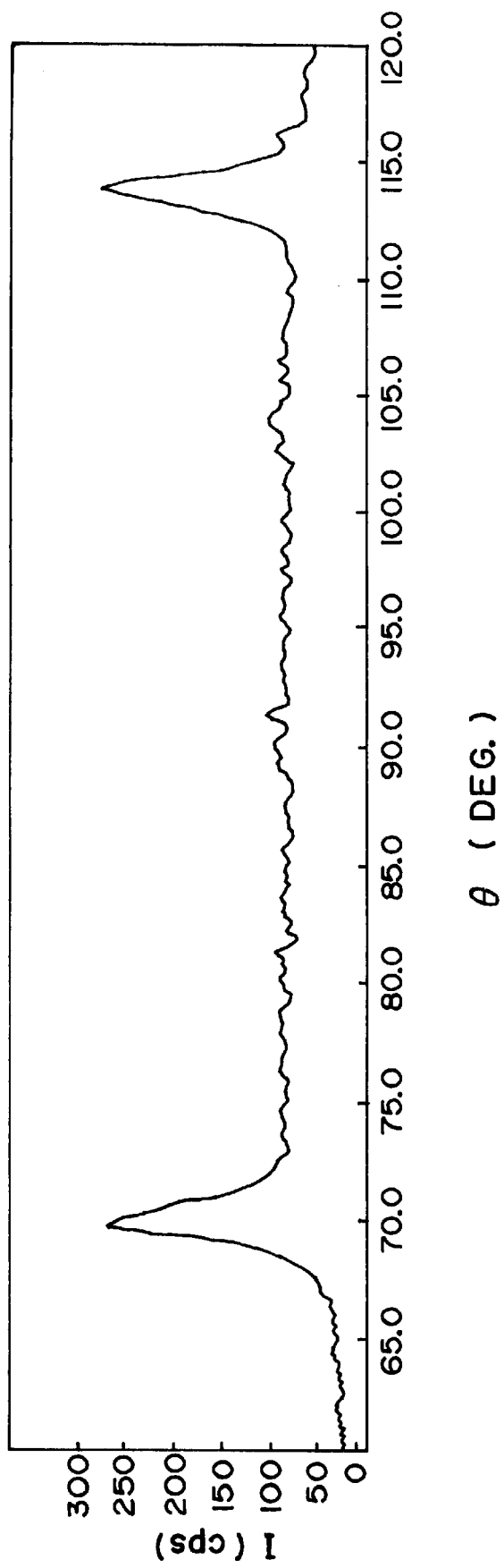
FIGS. 12 and 15 are X-ray diffraction charts for the liquid crystal device used in Examples 1 and 2 after the electric field application treatment, respectively.

As a result, as shown in FIG. 12, somewhat broad two peaks were observed at θ=69.5 deg. and θ=113.9 deg. when compared with those observed before the electric field application treatment, so that the liquid crystal composition LC-1 was found to assume a chevron structure providing a layer inclination angle δ of 22.2 deg. which was larger than that (δ=21.4 deg.) before the electric field application treatment.

Accordingly, the layer inclination angle δ of the liquid crystal composition LC-1 was found to be increased by ca. 1 deg. through the electric field application treatment. Further, as a result of the peak shapes after the electric field application somewhat broader than those before the electric field application, these broader peaks suggested a resultant layer structure (after the electric field application) provided with a somewhat bending characteristic.

EXAMPLE 2

A liquid crystal cell was prepared in the following manner.

A pair of 1.1 mm-thick glass substrates each provided with a 700 Å-thick stripe electrodes of ITO film as a transparent electrode were provided.

On each of the transparent electrodes, a polyimide precursor for forming a polyimide having a recurring unit (PI-b) shown below was applied by spin coating and pre-dried at 80° C. for 5 min., followed by hot-baking at 200° C. for 1 hour to obtain a 200 Å-thick p olyimide film. (PI-b)

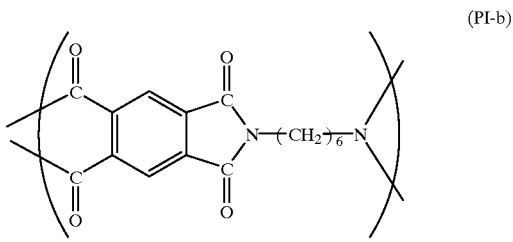

(PI-b)

Each of the thus-obtained polyimide film was subjected to rubbing treatment (as a uniaxial aligning treatment) with a nylon cloth in the same manner as in Example 1.

Then, on one of the substrates, silica beads (average particle size =2.0 μm) were dispersed and the pair of substrates were applied to each other so that the rubbing treating axes were in parallel with each other but oppositely directed (anti-parallel relationship), thus preparing a blank cell with a uniform cell gap.

When the blank cell was subjected to measurement of a pretilt angle α according to the crystal rotation method, the cell provided a pretilt angle a of 2.1 degrees.

A liquid crystal composition LC-1 prepared in the same manner as in Example 1 was injected into the above-prepared blank cell in its isotropic liquid state and gradually cooled to a temperature providing chiral smectic C phase to prepare a liquid crystal device (Device B).

When the thus-prepared Device B was subjected to observation of its alignment state in SmA through a polarizing microscope, a texture comprising alternating (first and second) stripes (odd-number stripes and even-number stripe) extending along the rubbing direction and including two regions different in molecular alignment (orientation) direction was observed and was also observed after gradual cooling to room temperature (30° C.). Under no electric field application, adjacent two stripe provided an angle formed between respective extinction positions of ca. 4 deg.

The Device B was subjected to application of a rectangular wave (±50 volts, 10 Hz) for 5 min. at 30° C. (electric field application treatment), and then observed through the polarizing microscope. As a result, the alignment state of the liquid crystal composition LC-1 was found to be changed from the stripe-shaped texture before the electric field application to a uniform alignment state.

Figure 13:
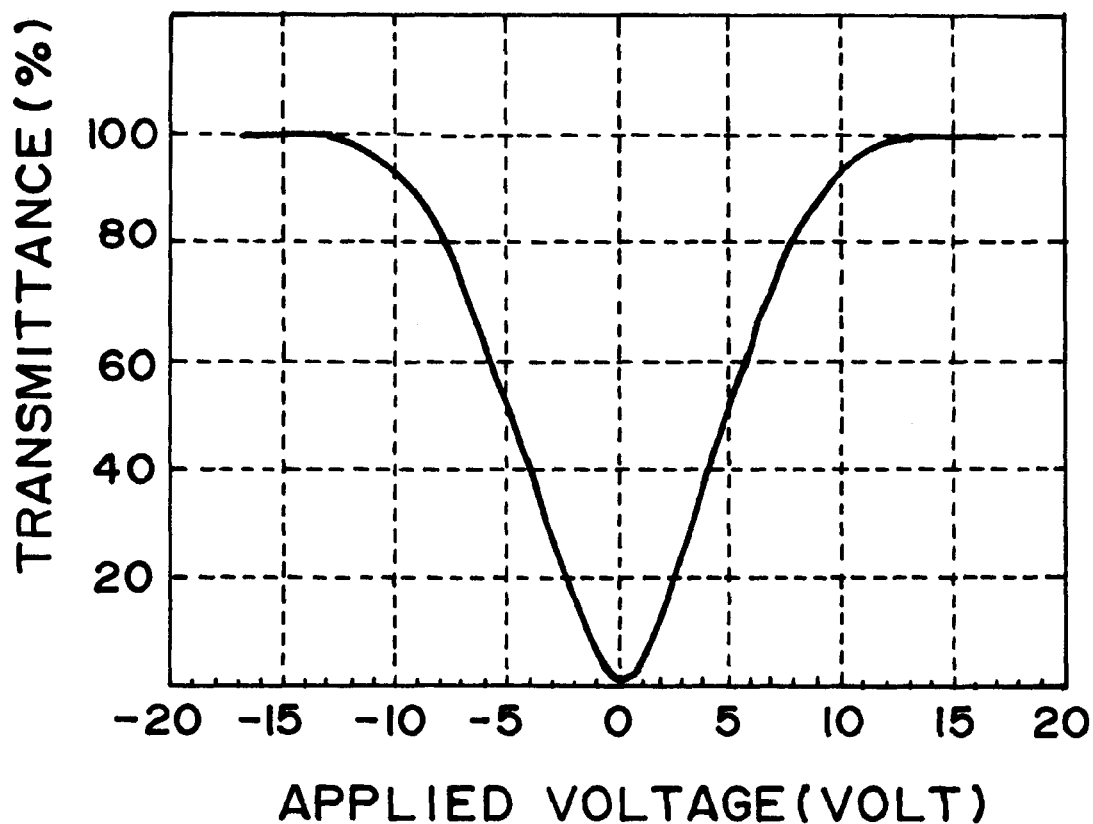

After the electric field application treatment, when the Device B was subjected to measurement of a transmittance by using a polarizing microscope provided with a photomultiplier while applying a a triangular wave in the same manner as in Example 1, it was found that a domainless switching was performed to provide a voltage-transmittance value (V-T curve) with no hysteresis as shown in FIG. 13.

As apparent from FIG. 13, the Device B provided a saturation voltage (Vsat) giving a T=100% of a ca. +13.0 volts.

Further, when the electric field application was terminated, the molecular axis (original darkest axis) was returned to the original position. Accordingly, in the Device B, it was found that the stablest molecular position was in a direction identical to the rubbing direction.

As also apparent from the V-T curve shown in FIG. 13, the Device B showed an optical response (transmittance) which continuously changed depending an the applied voltage, thus allowing an analog-like gradation display by amplitude modulation in an active matrix-driving scheme with TFTs.

The Device B was subjected to measurement of an optical response speed (response time) at 30° C. in the same manner as in Example 1.

As a result, when the Device B under no electric field application was supplied with a voltage of a negative polarity, a response time for increasing a transmittance (T) from 0% to 90% (from a black (dark) state to one of two white (bright) states) was 1.4 msec. Thereafter, the Device B (in one of the white states) was supplied with a voltage of a positive (opposite) polarity to change the alignment state of the liquid crystal molecules to the other white state at a response time (required for causing inversion (switching) from one white state (T=90%) to the other white state (T=90%)) of 2.0 msec. Further, when the positive-polarity voltage application to the device B was terminated, the liquid crystal molecules in the other white state (T=100%) was changed into the black state (T=10%) at a response time of 1.5 msec.

Then, the Device B was subjected to measurement of a layer inclination angle δ (of smectic molecular layers) of the liquid crystal composition LC-1 in the same manner as in Example 1 except that the rubbing axes were in an anti-parallel relationship.

Figure 14:
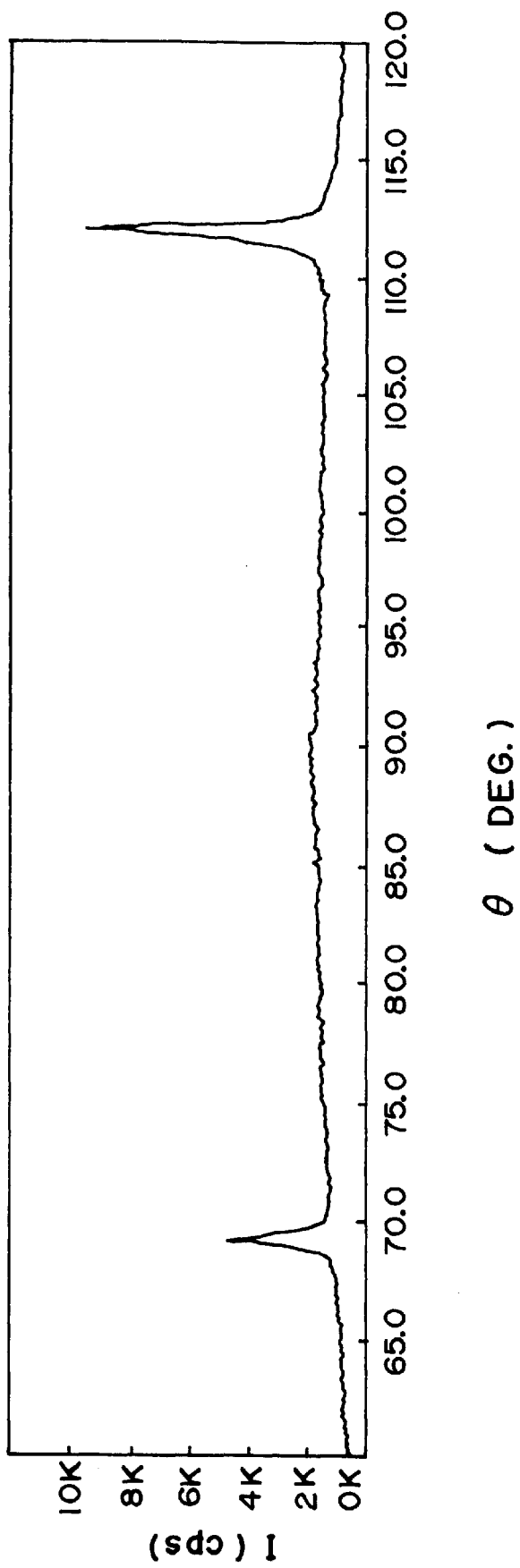

As a result of the X-ray diffraction analysis, two sharp peaks were observed at θ=69.1 deg. and θ=111.8 deg. as shown in FIG. 14, so that the liquid crystal composition LC-1 was found to assume a chevron structure providing a layer inclination angle δ of 21.4 degrees in the cell provided with the rubbing axes in the anti-parallel relationship.

Figure 15:
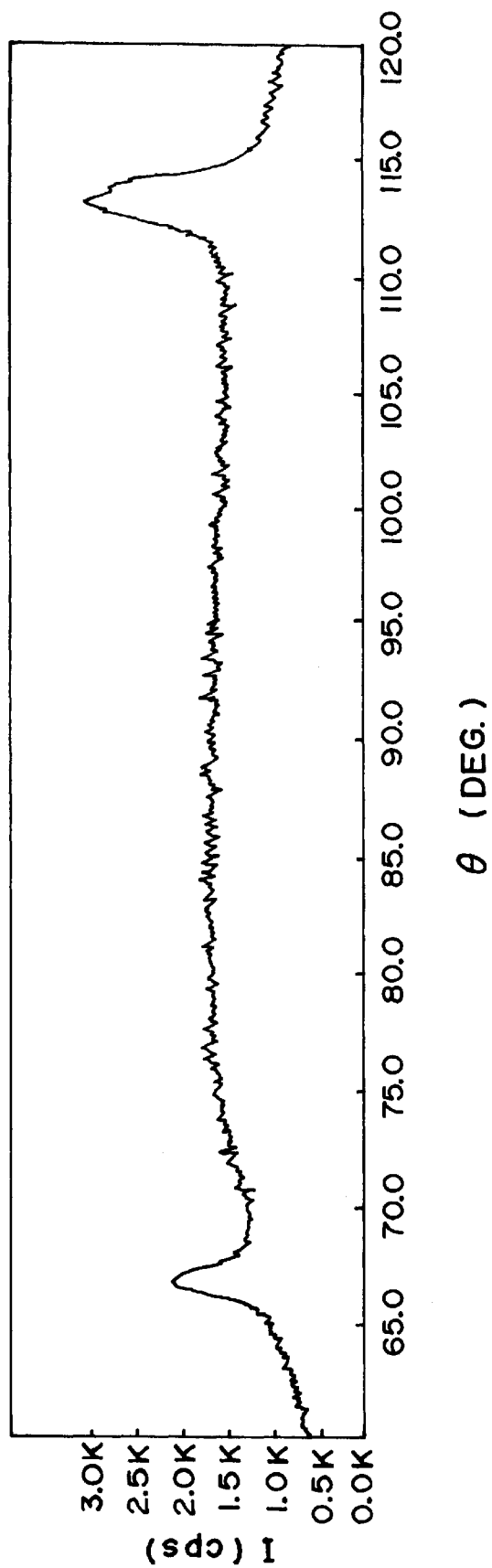

Then, when the X-ray measurement cell was subjected to electric field application treatment in the same manner as in Example 1, as shown in FIG. 15, somewhat broad two peaks were observed at θ=66.7 deg. and θ=113.3 deg. when compared with those observed before the electric field application treatment, so that the liquid crystal composition LC-1 was found to assume a chevron structure providing a layer inclination angle δ of 23.3 deg. which was larger than that (δ=21.4 deg.) before the electric field application treatment.

Accordingly, the layer inclination angle δ of the liquid crystal composition LC-1 was found to be increased by ca. 2 deg. through the electric field application treatment. Further, as a result of the peak shapes after the electric field application somewhat broader than those before the electric field application, these broader peaks suggested a resultant layer structure (after the electric field application) provided with a somewhat bending characteristic.

Incidentally, a layer spacings in SmC* ($d_C$) and a layer spacing in SmA (dA) (generally in the vicinity of a phase transition temperature from SmA to SmC*) geometrically satisfy the following relationship:

$$d_C = d_A \cos\delta.$$

Accordingly, when layer spacings $d_A$ and $d_C$ in SmA and SmC* were measured, a (calculated) layer inclination angle $\delta_{cal}$ can be determined.

More specifically, for measurement of the layer spacings $d_A$ and $d_C$, a sample liquid crystal composition was applied in a 5 mm-square size so as to form a flat surface on an 80 μm-thick glass sheet and, while being temperature-controlled by an automatic temperature controller, was subjected to measurement of X-ray diffraction intensity similarly as in the ordinary powder X-ray diffraction. A resultant angle providing a peak of X-ray intensity was substituted in the Bragg's formula for diffraction condition to obtain the layer spacings $d_A$ and $d_C$.

For measurement, the liquid crystal composition LC-1 was first brought to its isotropic phase temperature, and the measurement was repeated every 3° C. from the Iso temperature to the SmA temperature and every 1° C. from the SmA temperature to a temperature in the vicinity of a phase transition temperature (SmA to SmC*) while cooling the composition down to a temperature where no diffraction peak was observed. The automatic temperature controller used showed a control accuracy of ±0.3° C. at each measurement temperature.

As a result, the liquid crystal composition LC-1 showed a layer spacing $d_A$ in SmA (at 46° C.) of 29.824 Å and a layer spacing $d_C$ in SmC* (at 30° C.) of 27.8087 Å, thus providing $\delta_{cal}$ of 21.2 deg.

EXAMPLE 3

In this example, a liquid crystal device satisfying a relationship of $\delta \leq \widehat{H}$ by using a pressure application treatment in combination with a liquid crystal material having a relative large Ps.

A liquid crystal composition LC-2 was prepared by mixing the following compounds in the indicated proportions.

| Structural formula | wt. parts |
|---|---|
| 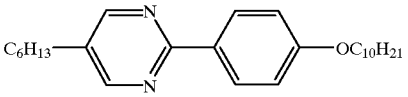 | 45 |
| 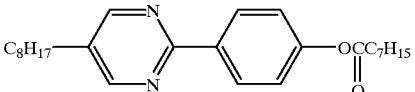 | 15 |
| 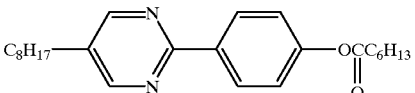 | 15 |
| 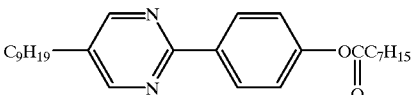 | 15 |
| 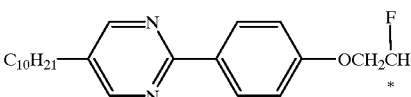 | 10 |

The thus-prepared liquid crystal composition LC-2 showed the following phase transition series and physical properties.

Phase transition temperature (°C)

Iso $\xrightarrow{58.2}$ Ch $\xrightarrow{50.2}$ SmA $\xrightarrow{44.1}$ SmC* $\xrightarrow{-11.3}$ Cry Spontaneous polarization (Ps): 6.62 nC/cm² (30° C.)
Tilt angle (Ⓗ): 22.1 degrees (30° C.)
Helical pitch (SmC*): at least 20 μm (30° C.) (roughly calculated value due to a longer pitch)

The liquid crystal composition LC-2 was injected a blank cell (prepared in the same manner as in Example 1) in its isotropic liquid state and gradually cooled to a temperature providing chiral smectic C phase to prepare a liquid crystal device (Device C).

When the thus-prepared Device C was subjected to observation of its initial alignment state at 30° C. through a polarizing microscope, the initial alignment state was found to be bistable states comprising two domains in mixture.

On the entire surface of the Device C, prescribed load was exerted by using a roller machine under conditions including a roller diameter of 10 cm, a rubber hardness of 90 deg., upper roller pressure of 0.6 MPa, lower roller pressure of 0.9 MPa, pressing depth of 0.5 mm and a device supply rate of 50 mm/sec at 30° C. (pressure application treatment), and then observed through the polarizing microscope. As a result, the alignment state of the liquid crystal composition LC-1 was found to be changed from the bistable states (the mixture of two domains) to a uniform alignment state in which the darkest axis (an axis providing the darkest state) was aligned with the rubbing direction.

After the pressure application treatment, the Device C was subjected to measurement of a transmittance by using a polarizing microscope provided with a photomultiplier in a right-angle cross-nicol relationship while applying a a rectangular wave (voltage=0 to ±15 volts, frequency=0.1 Hz) in a state such that the polarizing axis was aligned with the rubbing direction to provide the darkest state.

As a result, it was found that a domainless switching was performed to provide a voltage-transmittance curve (V-T curve) with no hysteresis including a V-shaped line.

Further, the Device C provided a saturation voltage (Vsat) giving a T=100% of a ca. ±4.0 volts.

Further, when the electric field (triangular wave) application was terminated, the molecular axis (original darkest axis) was returned to the original position. Accordingly, in the Device C, it was found that the stablest molecular position was in a direction identical to the rubbing direction.

As the Device C showed an optical response (transmittance) which continuously changed depending on the applied voltage, it is possible to drive the Device C in an active matrix driving scheme with TFTs in an amplitude modulation mode, thus allowing an analog-like gradation display.

The Device C was subjected to measurement of an optical response speed (response time) at 30° C. by detecting an optical response under application of a bipolar pulse voltage (V=±4.0 volts, pulse width=16.6 msec) in a right-angle cross-nicol relationship based on a reference transmittance (Tref) taken as 100% under application of ±4 volts.

WHen the Device C under no electric field application was supplied with a voltage of a negative polarity, a response time for increasing a transmittance (T) from 0% to 90% (from a black (dark) state to one of two white (bright) states) was 1.5 msec. Thereafter, the Device C (in one of the white states) was supplied with a voltage of a positive (opposite) polarity to change the alignment state of the liquid crystal molecules to the other white state at a response time (required for causing inversion (switching) from one white state (T=90%) to the other white state (T=90%)) of 1.6 msec. Further, when the positive-polarity voltage application to the device C was terminated, the liquid crystal molecules in the other white state (T=100%) was changed into the black state (T=10%) at a response time of 1.9 msec.

In this example, the pressure application may be performed in SmA and may be performed in combination with the electric field application treatment (as in Example 1), thus realizing $\delta \leq \text{ⓗ}$ stably.

EXAMPLE 4

A liquid crystal composition LC-3 was prepared by mixing the following compounds in the indicated proportions.

| Structural formula | wt. parts |
|---|---|
| $C_6H_{13}$—pyrimidine—phenyl—$OC_{10}H_{21}$ | 19.5 |
| $C_{10}H_{21}$—pyrimidine—phenyl—$OC_8H_{17}$ | 19.5 |
| $C_8H_{17}$—pyrimidine—phenyl—$OCOC_7H_{15}$ | 13 |
| $C_8H_{17}$—pyrimidine—phenyl—$OCOC_6H_{13}$ | 13 |
| $C_9H_{19}$—pyrimidine—phenyl—$OCOC_7H_{15}$ | 13 |
| $C_{11}H_{23}$—pyrimidine—phenyl—$OCO$—thiophene—$C_2H_5$ | 20 |
| $C_{10}H_{21}$—pyrimidine—phenyl—$OCH_2CHFC_8H_{17}$* | 2 |

The thus-prepared liquid crystal composition LC-3 showed the following phase transition series and physical properties Phase transition temperature (°C)

$$\text{Iso} \xrightarrow{65.3} \text{Ch} \xrightarrow{52.9} \text{SmA} \xrightarrow{52.1} \text{SmC*} \xrightarrow{-11.2} \text{Cry}$$

Spontaneous polarization (Ps): 0.96 nC/cm² (30° C.)
Tilt angle (Ⓗ): 19.1 degrees (30° C.)
Helical pitch (SmC*): at least 20 μm (30° C.)

The liquid crystal composition LC-3 was injected into a black cell (prepared in the same manner as in Example 1) in its isotropic liquid state and gradually cooled to a temperature providing chiral smectic C phase to prepare a liquid crystal device (Device D).

When the thus-prepared Device D was subjected to observation of its initial alignment state at 30° C. through a polarizing microscope, the initial alignment state was found to be bistable states comprising two domains in mixture.

The Device D was subjected to application of a rectangular wave (±40 volts, 10 Hz) for 5 min. at 30° C. (electric field application treatment), and then observed through the polarizing microscope. As a result, the alignment state of the liquid crystal composition LC-3 was found to be changed from the bistable states (the mixture of two domains) to a uniform alignment state in which the darkest axis (an axis providing the darkest state) was aligned with the rubbing direction.

After the electric field application treatment, the Device D was subjected to measurement of a transmittance by using a polarizing microscope provided with a photomultiplier in a right-angle cross-nicol relationship while applying a a rectangular wave (voltage=0 to ±15 volts, frequency=0.1 Hz) in a state such that the polarizing axis was aligned with the rubbing direction to provide the darkest state.

As a result, it was found that a domainless switching was performed to provide a voltage-transmittance curve (V-T curve) with no hysteresis including a V-shaped line.

Further, the Device D provided a saturation voltage (Vsat) giving a T=100% of a ca. ±11 volts.

Further, when the electric field (rectangular wave) application was terminated, the molecular axis (original darkest axis) was returned to the original position. Accordingly, in the Device D, it was found that the stablest molecular position was in a direction identical to the rubbing direction.

As the Device D showed an optical response (transmittance) which continuously changed depending on the applied voltage, it is possible to use the Device D in n active matrix-driving scheme with TFTs in an amplitude modulation mode, thus realizing an analog-like gradation display.

The Device D was subjected to measurement of an optical response speed (response time) at 30° C. by detecting an optical response under application of a bipolar pulse voltage (V=±5.0 volts, pulse width=16.6 msec) in a right-angle cross-nicol relationship based on a reference transmittance (Tref) taken as 100% under application of ±5 volts.

When the Device D under no electric field application was supplied with a voltage of a negative polarity, a response time for increasing a transmittance (T) from 0% to 90% (from a black (dark) state to one of two white (bright) states) was 1.7 msec. Thereafter, the Device D (in one of the white states) was supplied with a voltage of a positive (opposite) polarity to change the alignment state of the liquid crystal molecules to the other white state at a response time (required for causing inversion (switching) from one white state (T=90%) to the other white state (T=90%)) of 1.8 msec. Further, when the positive-polarity voltage application to the device D was terminated, the liquid crystal molecules in the other white state (T=100%) was changed into the black state (T=10%) at a response time of 2.1 msec.

Then, when the Device D was subjected to measurement of a layer inclination angle δ (of smectic molecular layers) of the liquid crystal composition LC-3 in the same manner as in Example 1, the liquid crystal composition LC-3 showed a δ after the electric field application of ca. 19.7 deg.

EXAMPLE 5

A liquid crystal composition LC-4 was prepared by mixing the following compounds in the indicated proportions.

| Structural formula | wt. parts |
|---|---|
| 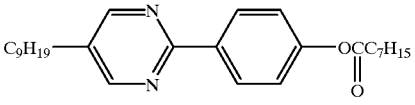 | 48.5 |
| 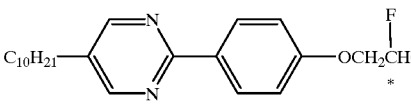 | 16.2 |
| 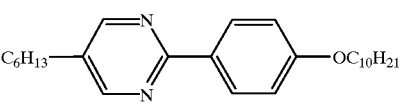 | 16.2 |

-continued

| Structural formula | wt. parts |
|---|---|
| 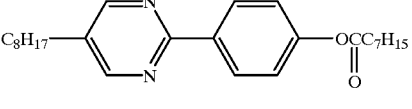 | 16.2 |
| 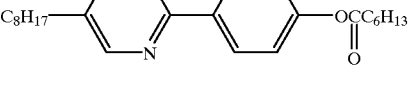 | 3 |

The thus-prepared liquid crystal composition LC-4 showed the following phase transition series and physical properties.

Phase transition temperature (°C)

$$\text{Iso} \xrightarrow{57.5} \text{Ch} \xrightarrow{47.1} \text{SmA} \xrightarrow{42.9} \text{SmC*} \xrightarrow{-8.8} \text{Cry}$$

Spontaneous polarization (Ps): 1.56 nC/cm$^2$ (30° C.)
Tilt angle (H): 20.5 degrees (30° C.)
Helical pitch (SmC*): at least 20 μm (30° C.)

Figure 16:
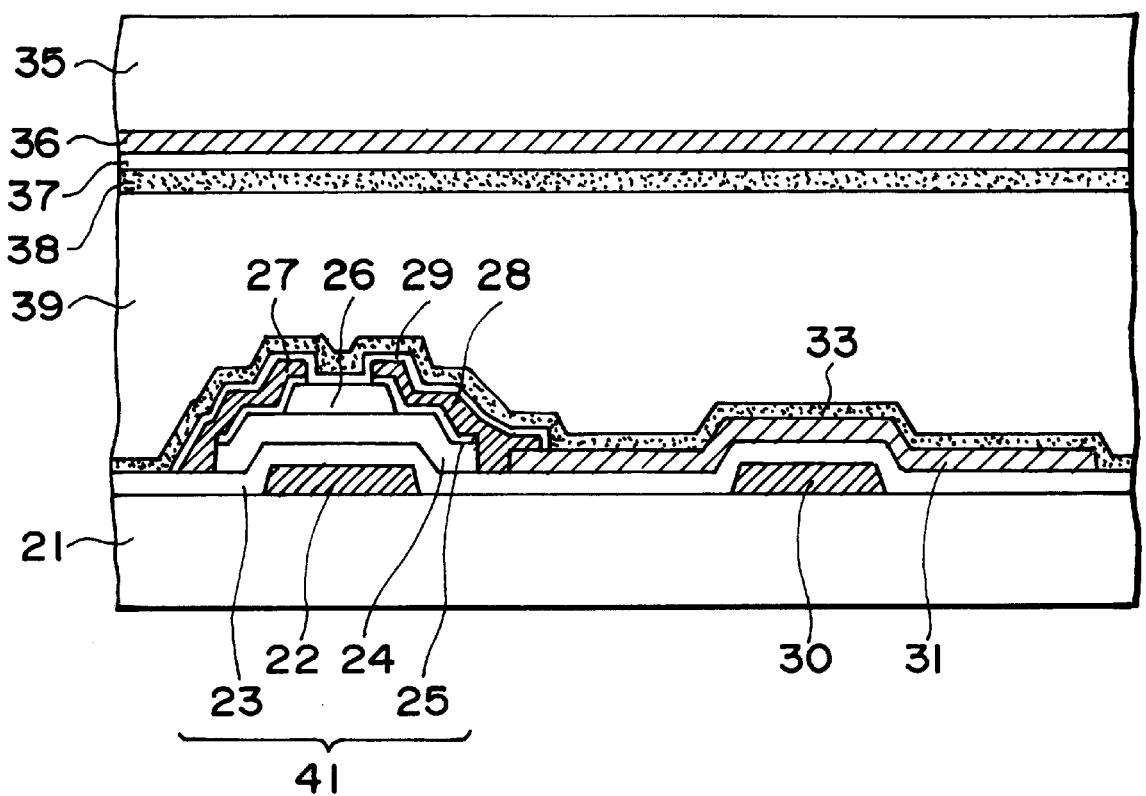
FIG. 16 is a partial sectional view of another embodiment of the liquid crystal device (of a TFT-type) according to the present invention used in Example 5.

The liquid crystal composition LC-41 was injected into a TFT-type blank cell (size=10.4 inch SVGA (800x600xRGB)) in its isotropic liquid state and gradually cooled to a temperature providing chiral smectic C phase to prepare a liquid crystal device (Device E). as shown in FIG. 16.

FIG. 16 shows a schematic (enlarged) sectional view of a portion corresponding to one pixel of the Device E (TFT panel).

Referring to FIG. 16, the Device E includes a pair of substrates 21 and 35 and a liquid crystal (the liquid crystal composition LC-4) 39 disposed therebetween.

On the substrate 21, a TFT 41 comprising: a gate electrode 22, a gate insulating film 23, a semiconductor layer 24, an ohmic contact layer 25, an insulating layer 26, a source electrode 27, a drain electrode 28 and a passivation film 29 is disposed.

On the substrate, a holding capacitor electrode is disposed apart from the TFT 41 and is successively coated with the gate insulating film 22 and a pixel electrode 31.

The pixel electrodes 31 and the TFT 41 is coated with an alignment film 33.

On the other substrate 35, a common electrode 36 is dispose and successively coated with an insulating layer 38 and an alignment film 38.

Figure 17:
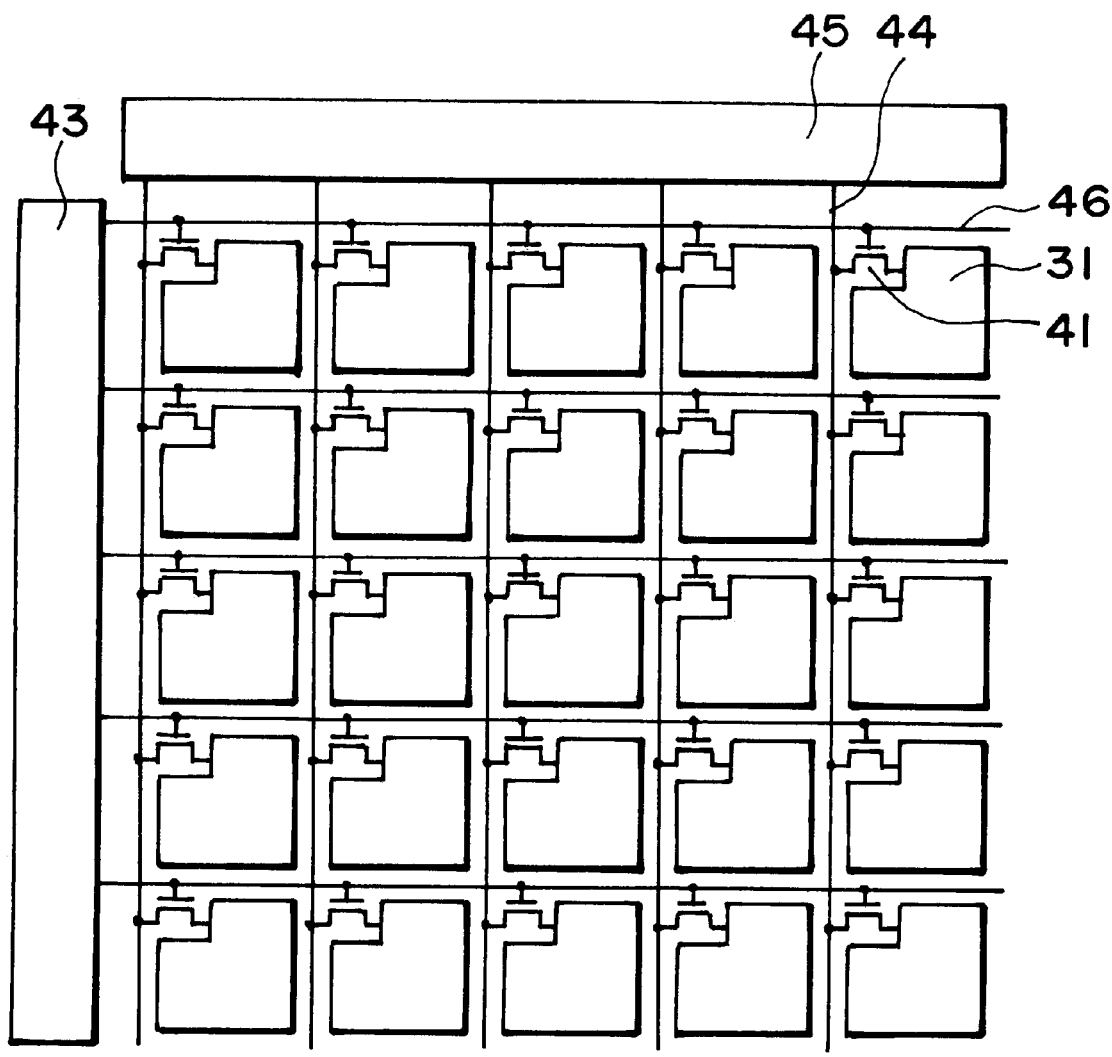
FIG. 17 is a schematic plan view of the liquid crystal device shown in FIG. 16 (used in Example 5).

Between Device E has an electrode structure including a plurality of pixel electrodes 31 arranged in a matrix form, thus forming a plurality of pixels each provided with a TFT 41 as shown in FIG. 17.

Referring to FIG. 17, gate electrodes (22 in FIG. 16) of the TFTs 41 are electrically connected to scanning signal lines 46 connected to a scanning signal application circuit 43 and source electrodes (27 in FIG. 16) of the TFTs 41 are electrically connected to data signal lines 44 connected to a data signal application circuit 45, respectively, in a matrix form.

Each of the scanning signal lines 46 is successively supplied with a scanning selection signal ("ON" signal for the TFT 41) and in synchronism with this scanning selection signal, a data signal including prescribed gradation display data is applied to a corresponding data signal line 44 to be transmitted to the pixel electrode 31 concerned with the selected line.

As a result, the liquid crystal (the liquid crystal composition LC-4) is supplied with a prescribed voltage, thus effecting a gradation display.

In the case where the Device E (TFT panel) shown in FIG. 16 is of a transmission-type, the substrate 21 may generally comprise a transparent substrate of glass or plastics. In the case of the Device E of a reflection-type, the substrate 21 may be an opaque substrate such as a silicon substrate in some cases.

In the case of the transmission-type Device E, the pixel electrodes 31 and the common electrode 36 may ordinarily be a transparent electrode of, e.g., ITO (indium tin oxide). When the Device E is of the reflection-type, the pixel electrodes 31 may also function as a reflection plate in some cases by forming the electrodes 31 with a metal having a high reflectance.

The semiconductor layer 24 may generally comprise amorphous silicon (a-Si), which is, e.g., formed in a thickness of ca. 200 nm on a glass substrate heated at ca. 300° C. by glow discharge decomposition (plasma chemical vapor deposition (plasma CVD)) with monosilane ($SiH_4$) diluted with hydrogen, and may also preferably comprise polycrystalline silicon (p-Si). The ohmic contact layer 25 may, e.g., a layer of $n^+$ a-Si doped with phosphorus. The gate insulating film 23 may generally be formed in a film of silicon nitride ($SiN_x$) by, e.g., the glow discharge decomposition.

The electrodes including the gate electrodes 22, the source electrodes 27, the drain electrodes 28, the holding capacitor electrodes 30 and other connection electrodes may generally be metal electrodes of, e.g., Al. In the case of a holding capacitor electrode 30 having a larger size, it is possible to use an ITO (transparent conductive film as the holding capacitor electrode 30.

The insulating layer 37 may comprise $Ta_2O_5$ etc. The insulating layer 26 and the passivation film 29 may preferably comprise an insulating film of silicon nitride etc.

The Device E prepared in this example may be driven by using a set of driving waveforms as shown in FIGS. 18A–18E.

Figures 18A, 18B, 18C, 18D, 18E:
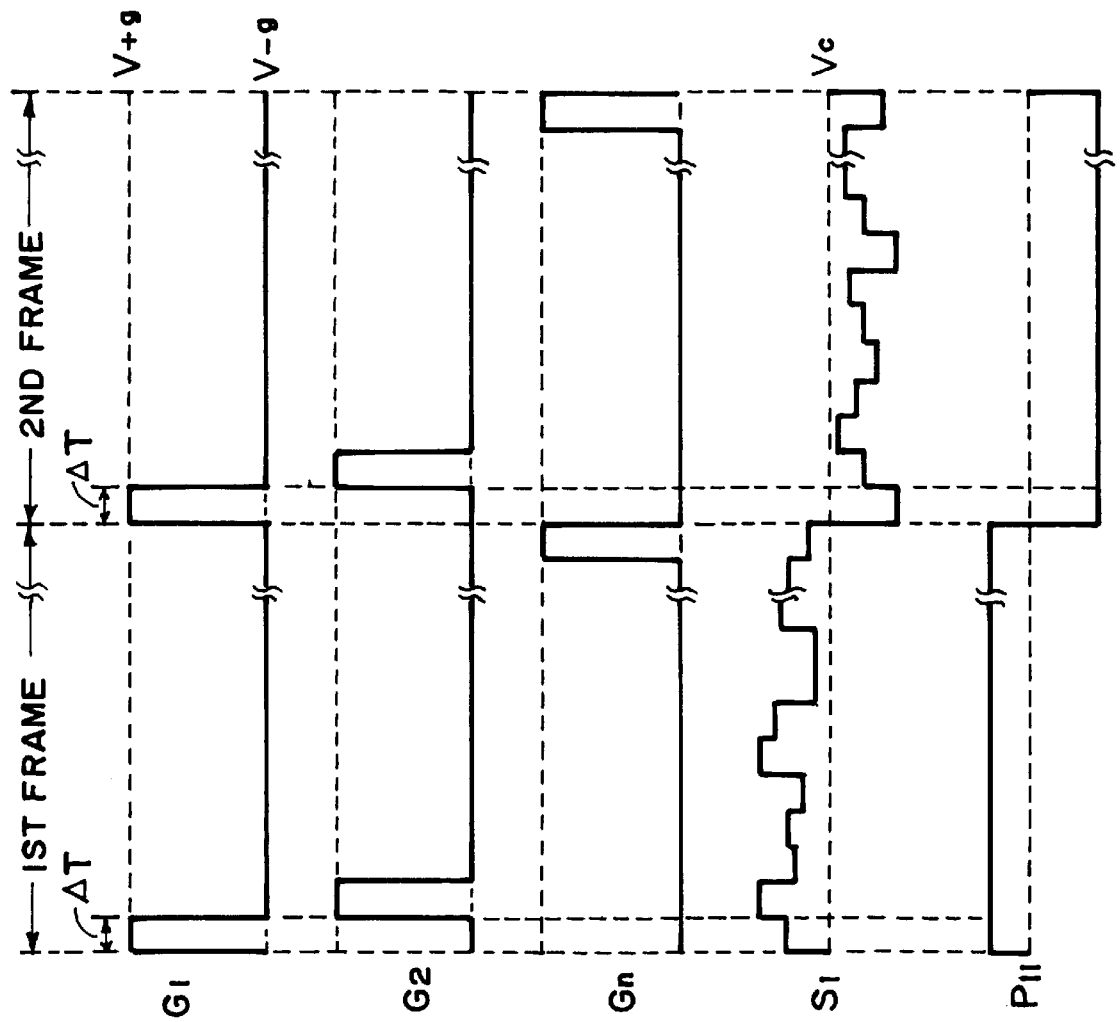
FIGS. 18A–18E are views showing a set of driving waveforms used in Example 5.

FIGS. 18A, 18B and 18C show scanning signal waveforms (gate voltage waveforms) $G_1$, $G_2$ and $G_n$ applied to a first scanning signal line, a second signal line, and the n-th scanning signal line, respectively.

FIG. 18D shows a data (source) signal waveform $S_1$ applied to a first data signal line.

FIG. 18E shows a combined waveform of the scanning and data signal waveforms $G_1$ and $S_1$ shown in FIGS. 18A and 18D corresponding to a voltage waveform applied to a pixel concerned with the first scanning signal line and the first data signal line.

In this example, the thus prepared Device E (TFT liquid crystal panel) was subjected to electric field application treatment for 5 min. at 30° C. by changing a voltage (potential) of ±40 volts and 10 Hz applied to the counter substrate (the substrate 35 shown in FIG. 16) while turning all the gates of the TFTs "ON".

After the electric field application, the Device E was driven at a frame frequency of 60 Hz to evaluate a motion picture quality in the following manner.

Three images (flesh-colored chart, sightseeing information (guide) board, and yacht basin) were selected from Hi-vision standard images (still images) of BTA (Broadcasting Technology Association) and were each cut into a central portion (corr. to 432×168 pixels) to prepare three sample images.

These sample images were moved at a speed of 6.8 (deg/sec) corresponding to that of an ordinary TV program to form motion picture images, which were outputted from a computer side (as an image source) at a picture rate of 60 frames per 1 sec. in a progressive (sequential scanning) mode, thus evaluating a degree of image blur particularly at a peripheral portion of the outputted images.

Specifically, evaluation of the images was performed by 10 amateur viewers in accordance with 5 evaluation levels ("5"(better) to "1" (worse)).

In this regard, when the evaluation was performed with respect to a commercially available CRT monitor, all the viewer evaluated the resultant images as a level of "5". Further, in the case of a commercially available (conventional) TFT liquid crystal panel, the evaluation result was a level of "2" or "3".

As a result of the evaluation of the Device E, good motion picture images free from a peripheral blue portion were obtained and the degree of the image blur was a level of "4" substantially comparable to that of the CRT monitor.

The Device E used in this example provided the tilt angle Ⓗ of 20.5 degrees and a layer inclination angle δ (after the electric field application treatment) of 20.8 degrees, thus satisfying the relationship of $\delta \geq$ Ⓗ.

EXAMPLE 6

A liquid crystal cell was prepared in the following manner.

A pair of 1.1 mm-thick glass substrates each provided with a 700 Å-thick stripe electrodes of ITO film as a transparent electrode were provided.

On each of the transparent electrodes, a polyimide precursor for forming a polyimide having a recurring unit (PI-b) shown below was applied by spin coating and pre-dried at 80° C. for 5 min., followed by hot-baking at 100° C. for 1 hour to obtain a 50 Å-thick polyimide film.

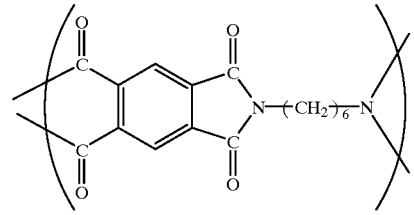

(PI-b)

Each of the thus-obtained polyimide film was subjected to rubbing treatment (as a uniaxial aligning treatment) with a nylon cloth under the following conditions to provide an alignment control film.

Rubbing roller: a 10 cm-dia. roller about which a nylon cloth ("NF-77", mfd. by Teijin K. K.)

Pressing depth: 0.3 mm

Substrate feed rate: 50 cm/sec

Rotation speed: 1000 rpm

Substrate feed: 2 times

Then, on one of the substrates, silica beads (average particle size=2.0 μm) were dispersed and the pair of substrates were applied to each other so that the rubbing treating axes were in parallel with each other but oppositely directed (anti-parallel relationship), thus preparing a blank cell with a uniform cell gap.

When the blank cell was subjected to measurement of a pretilt angle a according to the crystal rotation method, the cell provided a pretilt angle α of 2.0 degrees.

A liquid crystal composition LC-5 was prepared by mixing the following compounds in the indicated proportions.

| Structural formula | wt. parts |
|---|---|
| 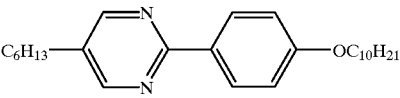 | 17.0 |
| 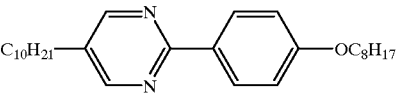 | 17.0 |
| 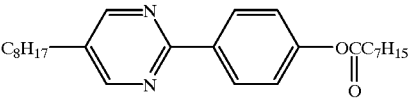 | 11.3 |
| 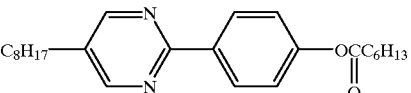 | 11.3 |
| 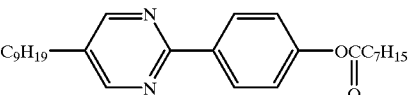 | 11.3 |
| 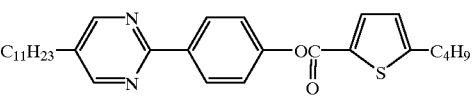 | 30.0 |
| 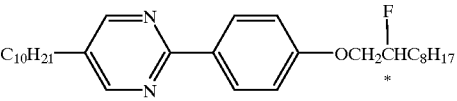 | 2.0 |

The thus-prepared liquid crystal composition LC-5 showed the following phase transition series and physical properties.

Phase transition temperature (°C)

Iso $\xrightarrow{66.9}$ Ch $\xrightarrow{50.5}$ SmC* $\xrightarrow{-9.5}$ Cry

Spontaneous polarization (Ps): 1.2 nC/cm² (30° C.)
Tilt angle (Ⓗ): 21.9 degrees (30° C.)
Helical pitch (SmC*): at least 20 μm (30° C.)

The liquid crystal composition LC-5 was injected into the above-prepared blank cell in its isotropic liquid state and gradually cooled to a temperature providing chiral smectic C phase to prepare a liquid crystal device (Device F).

When the thus-prepared Device F was subjected to observation of its initial alignment state at 30° C. through a polarizing microscope, the initial alignment state was found to be bistable states comprising two domains in mixture different in their layer normal directions.

The Device F was subjected to application of a rectangular wave (±50 volts, 700 Hz) for 5 min. at from 60° C. (Ch) to 30° C. (SmC*) (electric field application treatment), and then observed through the polarizing microscope. As a result, the alignment state of the liquid crystal composition LC-5 was found to be changed from the bistable states (the mixture of two domains) to a uniform alignment state in which the darkest axis was aligned with the rubbing direction.

After the electric field application treatment, the Device F was subjected to measurement of a transmittance by using a polarizing microscope provided with a photomultiplier while applying a a rectangular wave (voltage=0 to ±15 volts, frequency=0.1 Hz) in a state such that the polarizing axis was aligned with the rubbing direction to provide the darkest state.

As a result, it was found that a domainless switching was performed to provide a V-T curve with no hysteresis including a V-shaped line.

Further, the Device F provided a saturation voltage (Vsat) giving a T=100% of a ca. ±10.0 volts.

Further, when the electric field (rectangular wave) application was terminated, the molecular axis (original darkest axis) was returned to the original position. Accordingly, in the Device F, it was found that the stablest molecular position was in a direction identical to the rubbing direction.

As the Device F showed an optical response (transmittance) which continuously changed depending on the applied voltage, the Device F can be driven in a TFT-type active matrix driving scheme in an amplitude modulation mode to effect an analog-like gradation display.

The Device F was subjected to measurement of an optical response speed (response time) at 30° C. by detecting an optical response under application of a bipolar pulse voltage (V=±15.0 volts, pulse width=16.6 msec) in a right-angle cross-nicol relationship based on a reference transmittance (Tref) taken as 100% under application of ±5 volts.

When the Device F under no electric field application was supplied with a voltage of a negative polarity, a response time for increasing a transmittance (T) from 0% to 90% (from a black (dark) state to one of two white (bright) states) was 1.7 msec. Thereafter, the Device F (in one of the white states) was supplied with a voltage of a positive (opposite) polarity to change the alignment state of the liquid crystal molecules to the other white state at a response time (required for causing inversion (switching) from one white state (T=90%) to the other white state (T=90%)) of 1.9 msec. Further, when the positive-polarity voltage application to the device F was terminated, the liquid crystal molecules in the other white state (T=100%) was changed into the black state (T=10%) at a response time of 2.0 msec.

Then, the Device F was subjected to measurement of a layer inclination angle δ (of smectic molecular layers) of the liquid crystal composition LC-5 in the same manner as in Example 1.

As a result of the X-ray diffraction analysis, three weak peaks at θ=73.6 deg. θ=90.0 deg. and θ=92.6 deg. and one strong peak at θ=106.8 deg. were observed. Further, no irregular alignment portion was observed in the X-ray measurement area under the polarizing microscopic observation, so that the liquid crystal composition LC-5 may presumably have a layer structure (chevron structure) including plural bending portions in a direction perpendicular to the substrates.

Then, the X-ray measurement cell was subjected to electric field application treatment in the same manner as in the Device F (i.e., application of a rectangular wave (±50 volts, 700 Hz) for 5 min. from 60° C. to 30° C. (Ch-SmC*)), followed by measurement of a layer inclination angle δ in the same manner as mentioned above.

Figure 19:
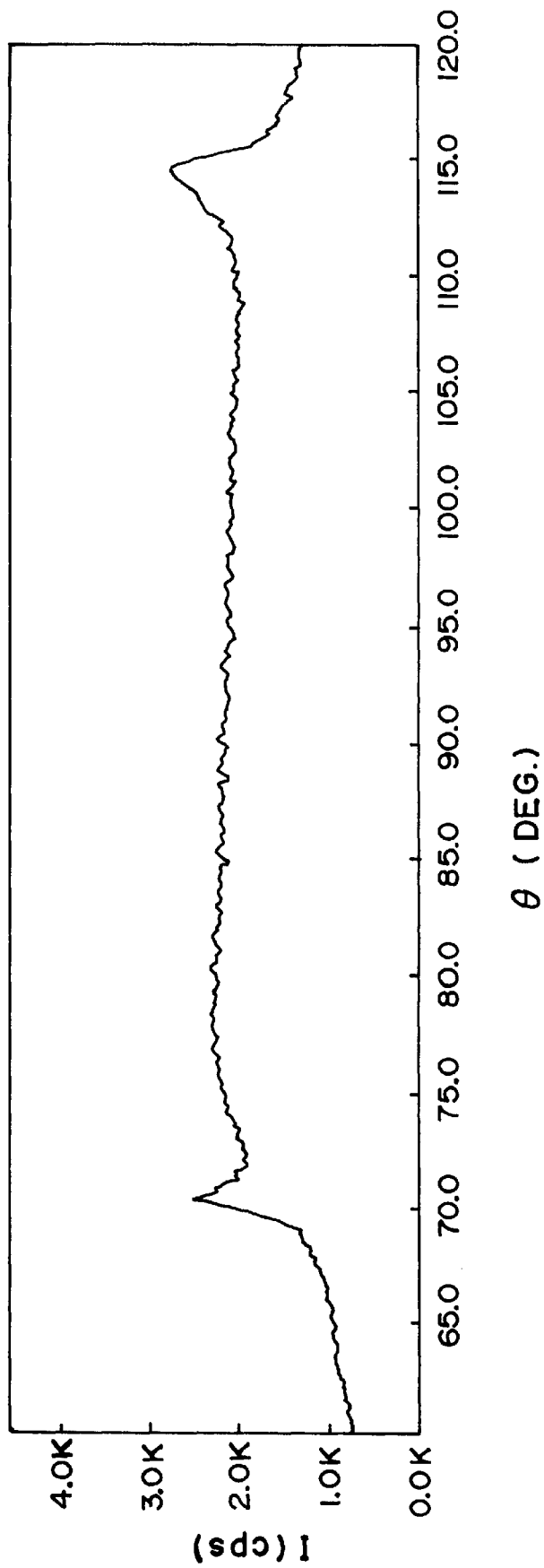
FIG. 19 is an X-ray diffraction chart for. the liquid crystal device of the present invention used in Example 6 after an electric field application treatment.

As a result, as shown in FIG. 19, somewhat broad two peaks were observed at θ=70.4 deg. and θ=114.5 deg. when compared with those observed before the electric field application treatment, so that the liquid crystal composition LC-1 was found to assume a chevron structure providing a layer inclination angle δ of 22.1 deg. which was larger than that before the electric field application treatment.

Accordingly, the liquid crystal composition LC-5 was found to have an increased δ layer inclination angle and a clear chevron structure

What is claimed is:

1. A liquid crystal device, comprising:
    a pair of oppositely disposed substrates and a liquid crystal having chiral smectic C phase disposed therebetween, each of the substrates having thereon an electrode for applying a voltage to the liquid crystal, at least one of the substrates being provided with a uniaxial alignment axis for aligning the liquid crystal,
    wherein the liquid crystal is placed in an alignment state in chiral smectic C phase such that:
        (a) under no electric field application, the liquid crystal forms a chevron structure and is placed in a monostable alignment state such that an average molecular axis substantially in alignment with the uniaxial alignment axis and/or a bisector of a maximum angle formed between two extreme molecular axes established under electric field application, and
        (b) under electric field application, the liquid crystal provides an effective tilt angle and a transmittance that continuously changed depending on an electric field applied thereto.

2. A device according to claim 1, wherein the liquid crystal provides a layer inclination angle δ with a normal to the substrates and provides a tilt angle Ⓗ in chiral smectic C phase, said angles δ and Ⓗ satisfying the following relationship at least an operating temperature:

$$\delta \geq Ⓗ.$$

3. A device according to claim 2, wherein the liquid crystal shows a phase transition series including isotropic phase (Iso), cholesteric phase (Ch), smectic A phase (SmA) and chiral smectic C phase (SmC*) on temperature decrease, and is subjected to an electric field application treatment in at least one of Ch, SmA and SmC*.

4. A device according to claim 2, wherein the liquid crystal shows a phase transition series including isotropic phase (Iso), cholesteric phase (Ch), smectic A phase (SmA) and chiral smectic C phase (SmC*) on temperature decrease, and is subjected to a pressure application treatment in at least one of SmA and SmC*.

5. A device according to claim 2, wherein the liquid crystal shows a phase transition series including isotropic phase (Iso), cholesteric phase (Ch) and chiral smectic C phase (SmC*) on temperature decrease, and is subjected to an electric field application treatment in at least one of Ch and SmC*.

6. A device according to claim 2, wherein the liquid crystal in chiral smectic C phase provides a layer inclination angle δ after being subjected to an electric field application treatment and/or a pressure application treatment, said layer inclination angle δ being larger than an initial layer inclination angle $\delta_0$ given by cooling the liquid crystal from its isotropic phase.

7. A device according to claim 1, wherein the liquid crystal in chiral smectic C phase provides a layer inclination angle δ larger than a layer inclination angle calculated based on a layer spacing temperature change thereof in its bulk state at least an operating temperature.

8. A device according to claim 1, wherein the liquid crystal in chiral smectic C phase provides a layer inclination angle δ after being subjected to an electric field application treatment and/or a pressure application treatment, said layer inclination angle δ being larger than an initial layer inclination angle $\delta_0$ given by cooling the liquid crystal from its isotropic phase.

9. A device according to claim 1, wherein the liquid crystal in chiral smectic C phase provides a helical pitch in its bulk state equal to or larger than a value which is two times a cell thickness.

10. A device according to claim 1, wherein one of the substrates is provided with a plurality of active elements each connected to an electrode so as to allow an analog gradation display.

11. A liquid crystal display apparatus, comprising: a liquid crystal device according to any one of claims 1–10, a drive circuit for driving the liquid crystal device, and a light source.

12. An apparatus according to claim 11, wherein the liquid crystal device is driven by the drive circuit according to an active matrix driving scheme to effect a gradation display.

* * * * *